US009653874B1

(12) United States Patent
Asprey

(10) Patent No.: US 9,653,874 B1
(45) Date of Patent: May 16, 2017

(54) TRICHEL PULSE ENERGY DEVICES

(71) Applicant: William J. Asprey, Lake Stevens, WA (US)

(72) Inventor: William J. Asprey, Lake Stevens, WA (US)

( * ) Notice: Subject to any disclaimer, the term of this patent is extended or adjusted under 35 U.S.C. 154(b) by 0 days.

(21) Appl. No.: 14/799,493

(22) Filed: Jul. 14, 2015

Related U.S. Application Data

(63) Continuation-in-part of application No. 13/448,331, filed on Apr. 16, 2012, now Pat. No. 9,080,982.

(60) Provisional application No. 61/517,187, filed on Apr. 16, 2011.

(51) Int. Cl.
*H01S 3/09* (2006.01)
*H01S 3/11* (2006.01)
*H01S 3/104* (2006.01)

(52) U.S. Cl.
CPC ............ *H01S 3/0906* (2013.01); *H01S 3/104* (2013.01); *H01S 3/11* (2013.01)

(58) Field of Classification Search
CPC .............................. H01S 3/0906; H01S 3/038
See application file for complete search history.

(56) References Cited

U.S. PATENT DOCUMENTS 3,988,699 A * 10/1976 Zachariasse ............. H01S 3/20
359/342

* cited by examiner

*Primary Examiner* — Kara E Geisel
*Assistant Examiner* — Shawn Decenzo
(74) *Attorney, Agent, or Firm* — Mark Clodfelter

(57) ABSTRACT

Coherent Trichel Pulse transient energy emissions by directing energetic triggers for driving to unstable a Trichel Pulse generator (TPG) charged electrode or gap to elicit a phased or delayed emitted photon energy Trichel Pulse and electronic driven current pulse nearly contemporaneously due to electronic flow eruptive cascade into the discharge gap. Triggered random laser spherical emission or directed energy provided by concentric spherical or linear resonator mirrors optically pumping the spherical center TPG glow region of maximum energy densities at the spherical center provided with take off linear transmission of the resonator stimulated emissions providing linear propagation and targeting.

16 Claims, 26 Drawing Sheets

© 2015 William J. Asprey

*Fig.* 11

© 2015 William J. Asprey

BASIC TPG HALF ADDER

© 2015 William J. Asprey

TRICHEL PULSE ENERGY DEVICES

CROSS-REFERENCE TO RELATED APPLICATIONS

This application is a continuation-in-part of Applicant's U.S. patent application Ser. No. 13/448,331, filed Apr. 16, 2012, which is incorporated by reference in its entirety herein, and which claimed the benefit of Applicant's U.S. provisional patent application No. 61/517,197, filed Apr. 14, 2011, also incorporated by reference in its entirety herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The USEPA, USNIH, Dow AgroSciences LLC, FMC Corporation, their managers, owners, employees, retirees, contractors, and their dependents are expressly forbidden use of the copyrighted materials for any economic or other public purpose without specific written authorization from the copyright owner.

FIELD OF THE INVENTION

This invention relates generally to generation and use of Trichel pulses, and more particularly to applications related to light amplification involving Trichel pulses.

BACKGROUND OF THE INVENTION

A Trichel Pulse Generator (hereinafter TPG) emits light that may be triggered and used for limited duration molecular and atomic stimulation pumping for laser power and by newly discovered phasing effects. Laser energy from triggered trains of pumping Trichel pulses can be provided by various means providing energy triggered pulsed electrical discharge TEA lasers (Transversely Excited Atmospheric lasers).

Existing electrical discharge pulsed laser systems require a pulsed voltage applied to linear resonance chambers in externally switched pulse phased resonance to stimulate more efficient amplification of lasing during pulse phases. The TEA (Transversely Excited Atmospheric) laser as practiced requires fast high voltage potential limited distributed glowing to volumetrically stimulate a resonance chamber, and early researchers discovered voltage flashover from electrodes limited the volumetric stimulation of the working lasing medium. An early attempt to avoid this flashover problem with fast high energy voltage pulses was to distribute the voltage to a bar electrode with many pin-shaped "Pin-Bar" electrodes facing the opposing planar electrode, forcing current flow to divide among a line of pins and limiting discrete current flows with external resistors in series with the pins to avoid breakdown and provide a steady glow discharge during stimulation buildup and emission pulsing. The pulse widths attainable with "Pin-Bar" TEA lasers in the hundreds of ns is provided by externally switching on significant over-potential until plasma forms providing steady discharge 'brush' volumetric stimulation and turns off the supply voltage very rapidly to suspend a TEA stable glow pulse. Once switched off, further stimulation will eventually form in TEA lasers only after naturally triggering some time after applying the high voltage once again, or upon discharge 'striking' steady volumetric plasma glow with an transient overpotential. Later attempts to produce a stable volumetric glow discharge for TEA laser pulsing introduced secondary electrodes to induce larger electrodes to provide a larger steady glow discharge stimulation volume to amplify pulse power by integrating the stable brush discharge transversely across the chamber volumetrically.

Another operational problem with TEA lasers is that the ultimate pulse power is produced during the externally switched TEA amplification stimulation integration period volumetrically producing stimulated emission along a linear laser resonance chamber leading up to the ultimate, often Q-switched, volumetric TEA pulse. While TEA pulses are volumetric and sum as the glow region volume stimulated over extensive continuously stimulated regions, the lasing purely depends on a stimulation ratio preferentially in a linear lasing direction available for lase during the short power single mode lock pulse. Much of TEA stimulation spontaneously emits in random directions, failing to add coherent energy to generated laser pulses.

It is not evident that any of these methods produced Trichel pulses for the purpose of laser generation, although 'striking' the glow discharge may have produced some during transition to a stable glow discharge with no other recognized advantage. The advantages of detailed triggering providing smaller, higher and graded stimulation ratio volumes, radial mode locked stimulating emissions, and higher stimulation ratio density production efficiencies of Trichel pulses continues to evade current practice in power lasers to now.

Optoelectronic computer processing and bit transmission suffer from high energy use due to inefficient, long, misdirected, and overly intense laser pulses. Photon viewing suffers from identical problems. In addition, current practice in providing imagery for viewing damages fovea over time with overly intense color and phase fluences, especially due to coherent scattering and absorption of sunlight as daytime vision is currently practiced as UV levels climb and laser entertainment grows.

DETAILED DESCRIPTION OF THE INVENTION

Figure 1:
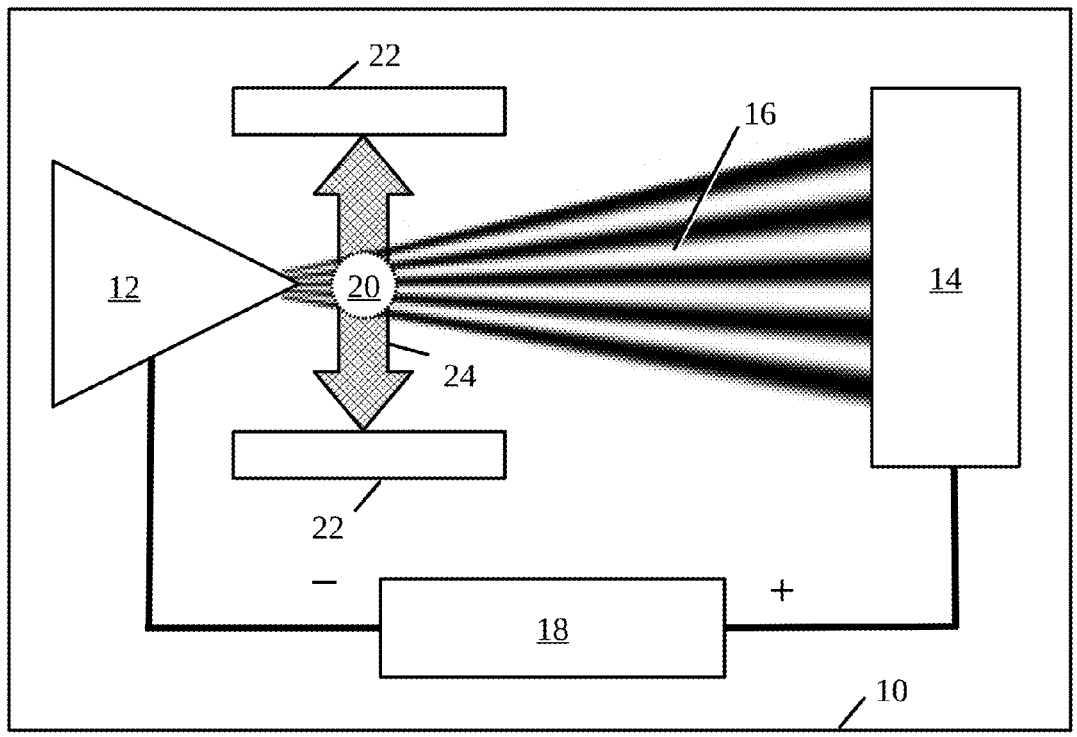
FIG. 1 is a diagrammatic view of a Trichel pulse generator (TPG) of the invention.

The present invention describes a number of uses for triggered lasers and especially Trichel pulses, which can be self-repeating trains of electron pulses formed between two electrodes to which a relatively high voltage differential is applied. While described as Trichel pulses herein, the present invention also contemplates energy triggered pulsed discharges that may not precisely be Trichel pulses by definition, but which are energy triggered phased electron discharges wherein an electrical or electron energy gradient is established between the electrodes and comprises electrons that have a lowest energy level nearest a negative electrode from which they are triggered to emit into an electrode gap and acquire progressively more energy as the electrons are accelerated toward a positive electrode. At specific regions or locations in the gradient, the progressively-accelerated electron pulsed energy gradients couple and provide quantum energy levels that stimulate specific gases or substances in the gap between the electrodes to glow or randomly spontaneously emit at their corresponding photonic quantum stimulated emission fluorescent or phosphorescent line wavelengths. Such photonic emissions may be used in a variety of ways, as will be described. A primary advantage is that trains of energy triggered Trichel pulses or similarly triggered pulsed discharges requires very little power to energetically trigger, generate, separate, and resonate highly variable quantum photonic emissions in both space and time. Thus, where only, for example, gases that generate red, white, and blue wavelengths when excited are present in a gap between the electrodes, color separation and mixing are possible to create a number of useful effects and devices without the use of inefficient solid phosphors. In other embodiments, separation of quantum emission wavelengths by the gradient of mixed gases and compounds may provide an analytical tool for identification of atomic and molecular species of the gases and compounds via explicit laser beaming. In yet other embodiments, emitted light may be produced coherently for use as a colored laser beam for direct visual stimulation.

The TPG operates to naturally switch on with sufficient potentials plus energy gradient triggering, and off with plasma dynamics which electro-statically choke TPG current flow with continuous DC voltage potential applied to electrodes thereof, providing electrical current and photonic pulse emissions of less than a ns (nanosecond) or so, naturally forming a triggered train of Trichel pulses at around a 1 GHz rate with optimized applied energetic triggering. Dynamic non-neutral plasma charge separation occurs as charge distributions in space, canceling applied TPG electric fields, choking current flow quickly and avoiding the external high voltage switching and limited efficiency problems inherent in "Pin-Bar" and other steady glow pulsed TEA lasers.

The TPG switch disclosed herein exhibits both 10% QE (Quantum Efficiency) photon triggering and TPG supply voltage controlling very fast pulsed current flows that feed emission photon power to the displaced localized plasma glow as very fast pulses electronically expressed as current pulses and photonically as emission pulsing.

FIG. 1 discloses the glow phenomena 20 of Trichel Pulses, which are self-repeating often invisibly triggered electric discharges that develop electronic energy gradient photon emissions in a gas which occupies non-linear gradient electric field 16 illustrated non-representational interpretation. Trichel pulses are initiated within a Trichel Pulse Generator (TPG) 10 shown with a more pointed negative electrode 12 opposes a generally planar positive electrode 14. A potential just insufficient to overcome the dielectric constant of a gas between electrodes 12, 14 is applied between electrodes 12, 14, causing an electric field gradient 16 to be established between electrodes 12,14. As the electrical gradient increases nearer point 12, a train of Trichel pulses will occur that electrically resemble a regularly occurring sawtooth waveform with a frequency of around 1 MHz when randomly triggered by naturally occurring environmental energies as with TEA lasers as practiced. Trichel pulses may be allowed to be triggered naturally, as by applying a gradually increasing potential between electrodes 12,14 until a train of pulses is established, or may be triggered by exogenous forces or events, including directing external photons, electronic or ionic fields, particle interactions, and so forth at the point of electrode 12 as with FIG. 6. In this case, the potential between electrodes 12, 14 is selected via polarized DC power supply 18 to be just below a potential that would elicit a train of Trichel pulses so that single pulses may be controllably elicited by such exogenous events similarly to geiger counting. Interestingly, Trichel pulses form a nearly spherical plasma glow region 20 displaced a few point diameters off the tip of electrode 12, which glow region containing spectral emissions of components of the gas separated in accordance with intensity of the electrical gradient. In other words, where the gap contains gases or dispersed compounds selected to glow red, green, and blue (RGB) at different electron excitation energies found in different regions of the electrical energy gradient of the glow region, then one part of the glow region will glow red, another part will glow green, and yet another part will glow blue. Such glow regions form non-linearly across the gap with time, far less than 1 ns (nanosecond) in some embodiments.

Resonator reflectors 22, which may be flat mirrors, may be employed as shown around a glow region 20, and are spaced from the glow region at a distance that is a function of an expected or diagnostic emitted photon wavelength from the glow region, causing the expected photonic emissions in the direction of the mirrors 22 to resonate and return repeatedly to glow region 20. As with any laser, this lases stimulated photonic emission and results in coherent light. The resonator length 24 between mirrors 22 determines emission pulse frequency mode locking as the length 24 divided by the speed of light defining the modes for frequency locking. In addition, a 1 meter pathway 24 resonator with a centered pulse glow would resonate with period T1mR=1 m/300000000 m/s=3.3 nsec providing generic frequency pulsed glow 20 emissions mode locking when the TPG pulses are triggered every 3.3 nsec, which time provides desirable communications and computations rates except for high power pulse beam generation using several consecutive triggered Trichel pulses for each resonance period which yields 2 million modes for 500 nm green photon mode locking and better than current practice pulse mode densities. Perhaps as small as micron sized resonator distances 24 could be fabricated which mode lock resonate at T1umR=1 um/300000000 m/s=3.3 fs, which in turn would allow a million or more resonances per Trichel Pulse while mode locking 2 green photons. This would be more useful as information processing than energetic propagations within the time frames of single Trichel pulses. Time phased triggering of Trichel pulse emissions with a 3.3 ns transit time of a 1 m resonator produces time integrated mode locking power pulsed laser effects unless the material emission wavelengths and integral multiple resonators to fit produce frequency mode locked resonances with very great amplification and short pulse widths. Broad spectrum gap materials and TPG triggered pulsing produce multi-mode amplification of the entire glow 20, distributed in time and color along the TPG glow 20. The specific frequency modes of the harmonic cancellation of the waves is randomized by the poorly localized and spectrally extensive TPG emissions until power removal as stimulated emission. Frequency mode locking is obtained usually within any coherent TPG emission integrally a multiple of the resonating chambers although energy sourced most closely to the center of the spheres 28 is most frequency locked when the wavelength also matches the resonator dimension integrally. This amplification of single frequency mode-locked lines is most valuable at extremely low analyte or emitter concentrations and so very few photons of interest are provided for coherence with each further TPG pulse.

Charge-limited Trichel pulse decay times down by 3 sigma are now possible within less than 1 nsec. This can be implemented by a limited charge voltage supplied via RLC bridge capacitative limits to TPGs that decrease the Trichel Pulse current with time with little effect on energy supplied per pulse. As such, the magnitude of the current pulse is high for a very short time, and is self-limiting in response to electrode potential deviations due to Debye electric field modifications which may be coupled with falling TPG pulse DC potentials during current amplification of the TPG pulses as tailored with RLC bridges for natural, internal TPG choking of power. RLC bridging is resistance, R, inductance, L, and capacitance, C, circuitry designed for providing voltage and current pulse timing relationships, or amplitude modulation with controlled feedback looping. In this embodiment, the RLC bridge effect is to limit TPG pulsing to energy triggered initiation.

Pulse widths less than 1 ns and repeat rates of a few ns, above 100 MHz, apply and scaling down further micromechanically provides even faster time scales as the charge acceleration through space in the electronic (qE) force gradient glow 20 of the TPG is the time (ns) consuming process which also separates the emission lines in time and space.

TPG 10 dimensions and the electrical gradient 16 are similarly parametric functions of the shape of the point of negative electrode 12, additional externally applied electric or magnetic fields (not shown), and the applied voltage from DC power supply 18 shown polarized as plus sign for the positive TPG electrode 14 and negative for the electron ejecting point of electrode 12.

Figure 2:
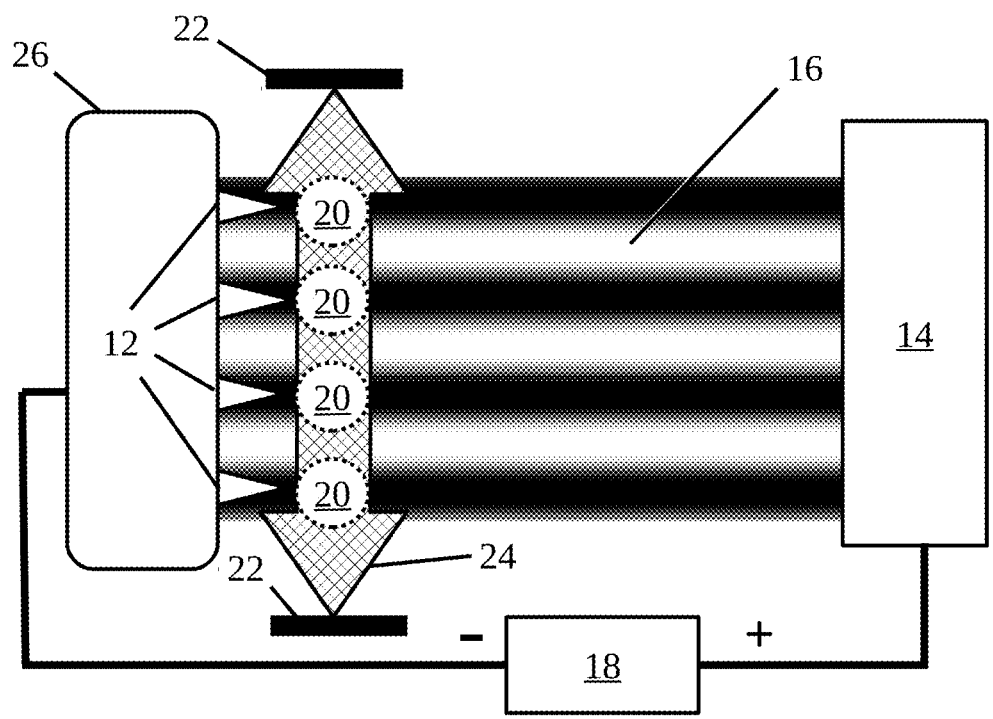
FIG. 2 is a diagrammatic view of another Trichel pulse generator of the invention.

FIG. 2 shows a paralleled array of four Trichel Pulse electrodes 12 supplied by common electrode 26. Trichel Pulse emissions 20 add in linear resonance distances 24 between flat resonator mirrors 22, and multiply emissions 20 photons from discharged electrodes 12, linearly correlating directed stimulated emission resonance when separated each along common electrode 26 by pulse triggering timing as function of integral multiples or fractions of photonic propagation time from points 12 separations and half integral points 12 mirror 22 distance. Resonance pulse timing due to separation of glow regions 20, and geometry of the resonator is configured for causing each emission glow 20 to be in phase with each other, along with previous and later glow emissions. In this manner, each glow 20 adds in phase to each TPG pulse as power mode locked electronic and photonic stimulation and linear stimulated emission negative absorption laser pulse energy amplification.

Figure 3:
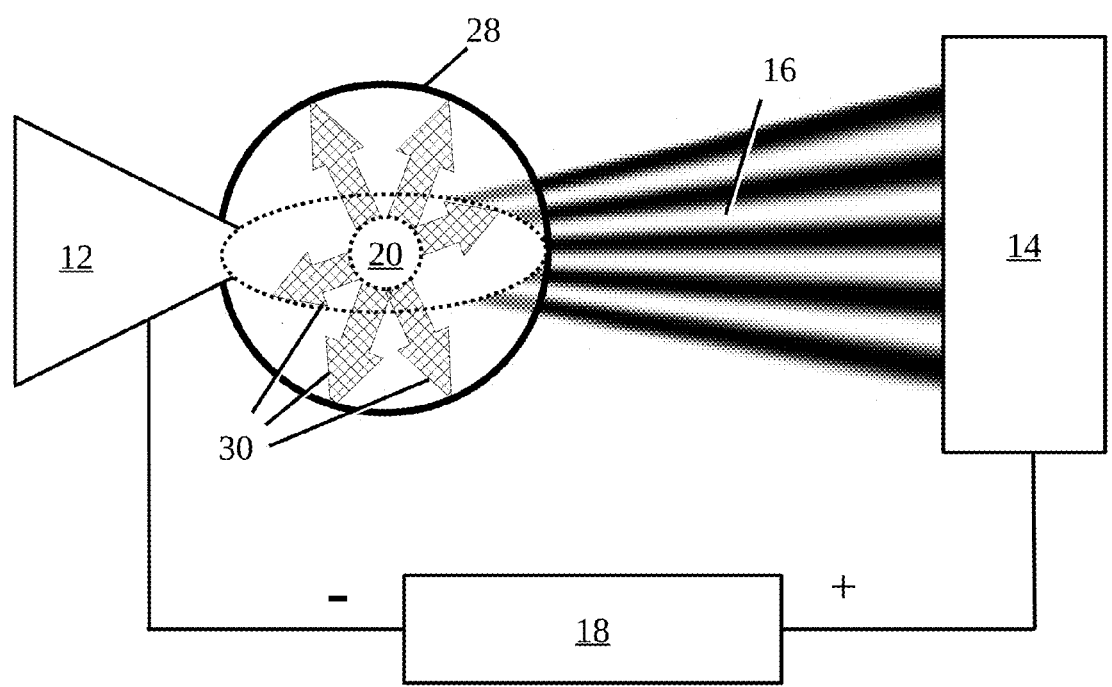
FIG. 3 is a diagrammatic view of a Trichel pulse generator provided with a spherically resonant chamber.

FIG. 3 discloses a spherical shell resonator mirror 28 and resonances 30, with glow region 20 generally concentrically centered within spherical shell resonator 28. Since spherical mirror 28 is concentric about glow region 20, or more particularly about a specific point defined by sphere 28 due to glow region 20 being a color-specific gradient, specific gradient related stimulation resonances 30 are pumped in 3 dimensions oscillating spherically. In other words, the radius of the sphere determines the pulse frequency from the point within glow 20 region that is resonantly pumped. This creates a far more efficient resonator than linear mirrors or cylinders for localized generally radial emissions, and increases efficiency up to close to the theoretical limits for stimulation density production efficiency with random directional stimulation and lase return from mirror 28 repeating as power mode locked. In some embodiments, the glow region 20 may be moved to obtain the most photons of the required frequency for pumping, as by moving at least the tip of electrode 12 to center the appropriate region within spherical resonator 28. The glow region may also be moved or made larger or smaller by changing the electrical potential between electrodes 12 and 14 or bleeding resonating energy. As noted above, the glow region may be made to occur in a single gas so that only a single selected wavelength is primarily emitted, or in a selected combination of gases so as to emit selected frequencies primarily.

Delayed phosphorescence resulting from a TPG emission is separated in pulse timing from the bulk of fluorescent, here inclusive of electron stimulation, photons by a spherical resonator 28. This compilation of resonance 30 pathways in 3 dimensions providing focused material electronic stimulation within the integrated 3D pathways resonating with maximum energy density centrally through glow 20 in or out of phase with further Trichel Pulses depending on the diameter of the spherical shell resonator mirror 28 and TPG triggering rates. Very high gains of resonance are available of over one million over a single Trichel Pulse glow 20. A single glow from a Trichel pulse emits different colors over time differentially across glow 20 assuming homogeneously distributed materials across the gradient 16. This allows storage of pulse energy integrated over time providing for sudden high fluence pulsed release to maximize energy densities far beyond current practice as well as providing particular colors which optimize coupling most efficiently with surfaces or detectors, lose little in translation, or carry parallel color-coded information streams including chemical identification as specifically mode locked emission lines. High emission regions integrated over whole pulses approach a nJ (nanoJoule) and are visible unaided in the dark, largely in quantum emissions as cold plasma TPG discharge.

At 100% QE (quantum efficiency) and a million gain: Power output at 1 MHz TPG triggered pulse rate per=1 nJ×1000000 gain/s=1 mJ/s=1 mW continuous output in pulses as short as ns (nanosecond) stimulated emission coherent pulses at MW (megawatt) and up directed efficient small spot fluences. The resonant power 30 can be removed (FIG. 4) in arbitrarily short time windows, as by mirrors 34, 36, with an aperture 38 in mirror 36 through which the resonant power 32 is emitted. These readily attained power levels open up whole new domains of directed energetic manipulation to TPG laser action as the power levels scale with TPG numbers, sizes, materials, and pulse widths providing wide varieties of laser fluence color, intensity, pulse width, coherence purity, energetic envelope, timing, or directions in space.

As mode locked pulses, the random laser TPG emission glow 20 in resonance round trip from glow 20 to spherical integrator mirror 28 and again to glow region 20 on average is provided by the time lag triggering of the glow 20 attaining the diameter of the sphere and returning to center region glow 20. Photon bunching for each pulse is accomplished by providing the pulse glow 20 in resonance 30 interactions to correlate or combine in mode locking upon return to the radially variant stimulated glow 20 center coincidentally with spherical mirror 28, or multiple reflections with further Trichel Pulses phased to amplify internally or linked with self or externally programmed triggering for separating, Q-switching, and mode locking colors amplified in time during the TPG emission. Valuable phosphorescence amplification outside the bulk of the power emission glow 20 random emission is mode locked and Q-switched outside the major emission pulse time which is damped in relation by incoherent resonance cancellation of distributed wavelengths not in resonant phase.

Much of the photonic energy at a given specific color, or frequency, is emitted from a relatively small region within the Trichel Pulse gradient 16, the spherically resonant photons will stimulate matter with resulting emissions coherently, and in a spherical pattern due to resonance 30 being radial and made up of stimulated emission lines from material, typically a gas, within regional resonance 30 stimulated by material (electronic) energetic gradients with each mode locked pulse.

Newly developed materials that reflect differing wavelengths at differing depths could be used to fabricate mirror 28 and allow multiple resonating colors at color-specific radii of spherical mirror 28. Here, multiple spherical mirrors, each having a radius different from others of the spherical mirrors, with each spherical mirror corresponding to a single resonant frequency of a selected color of light emitted from one or more Trichel pulses, could be fabricated or formed within a semi-transparent substrate. This would allow amplification of multiple frequencies of light from within a single TPG sphere with Q-switchable transmission transparency. In other embodiments, altering a radius of mirror 28 with pressure or heating, or mechanical or material alterations, such as piezoelectric distortion, provides changing resonance structures and maximum intensities in integrated laser output which enable multi-mode color-specific and pulse phased data transmission.

Figure 4:
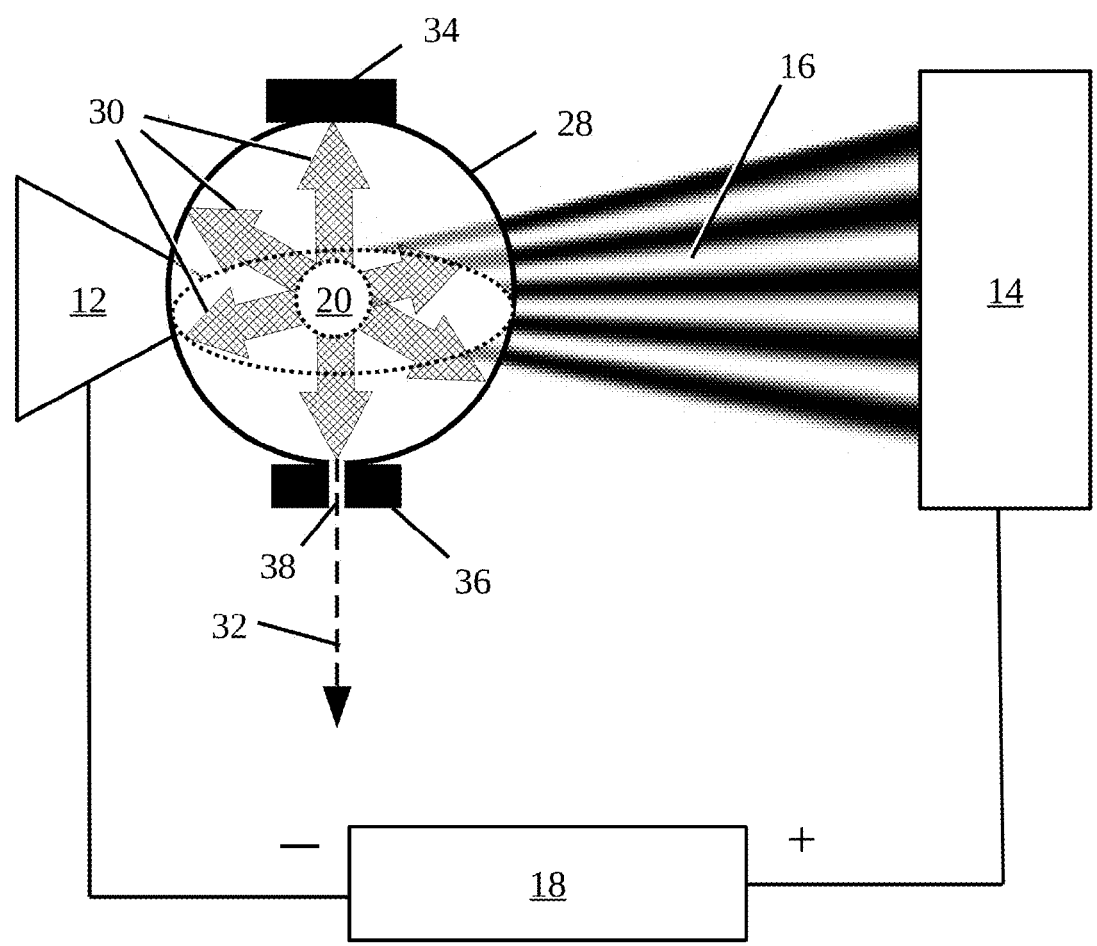
FIG. 4 is a diagrammatic view of the Trichel pulse generator of FIG. 3 showing a linear resonance take-off from the spherical chamber
Figure 10:
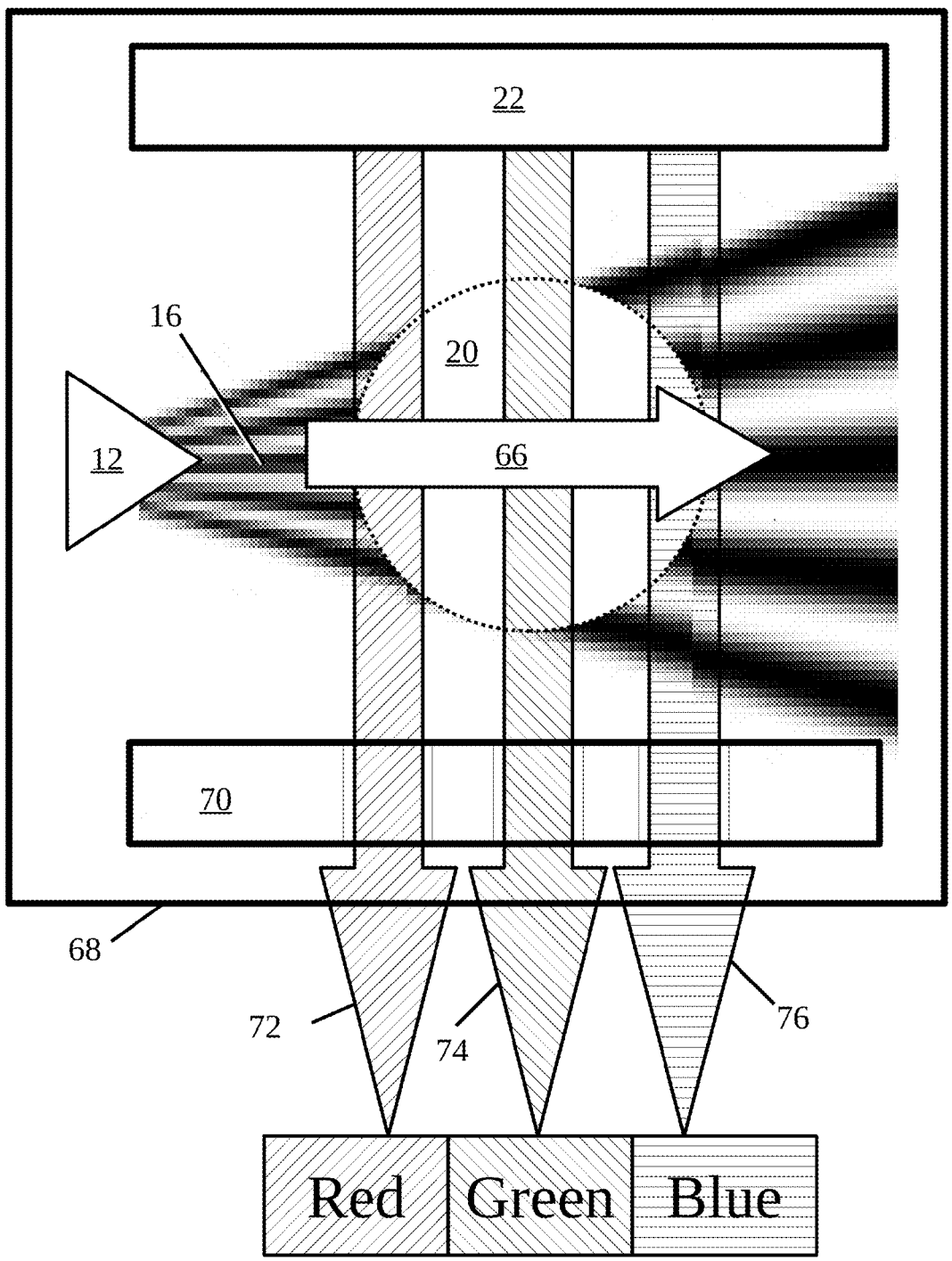
FIG. 10 is a diagrammatic view of apparatus for generating multi-color Trichel pulse emission amplification.

FIG. 4 discloses a laser output 32 from linear resonators 34 and 36 and opposing beam take off aperture 38 overlay tangent to reflector 28 equatorial spherical parallel tangent surfaces such that resonating photons 30 from glow 20 that intersect the optical take off port in beam take off 38 can be switched (Pockels or Kerr cell or etalon not shown) and directed from resonating photons 30 as a laser beam 32. Laser beam 32 collimation and phasing (lasing length) control may be provided by material glow and parametrically controlled by TPG design. Here, extremely well collimated beams are provided by nearly point emitted colors from the Trichel Pulse glow region 20 to effect color separations in time and space (FIG. 10). As such, aligning beam take off 32 and spherical resonator mirror 28 to be selectively centered or focused on a specific region of glow 20 provides a laser beam of different, specific colors at specific times corresponding to wavelengths of photons generated at the specific glow 20 region that spherical reflector 28 is focused on. As the temporal cadence of the glow formation and depletion is below 1 ns for some characteristic TPG single emission pulse 20 colors, including for phosphorescence, specific color amplification within specific time windows during or delayed from maximum TPG emission are provided. In some embodiments, reflector 28 may be moved slightly to focus on different regions of one or more Trichel pulses so as to generate laser beams from different regions of the Trichel pulses. In other embodiments, one or both of electrodes 12, 14 may be moved so as to move the various regions of the Trichel pulses for focusing by spherical reflector 28. In yet other embodiments, an electrical potential between electrodes 12, 14 may be varied to vary characteristics of emitted light from a focused region of glow region 20.

When a radius of spherical mirror or resonator 28 is an even number of wavelengths or an integral fractional harmonic of resonance of specific colors or frequencies (eg. 500 nm and 1000 nm harmonics) from a specific, focussed region of glow region 20, spherical resonances 30 serve to amplify beam 32 and mode lock bunch with further TPG pulses, providing very high fluence (above MW) pulsation and wide spectra of colors, pulse rates, and timing for data directing as beam 32 rendering. As data transport, the TPG emissions contain information about triggering time, specific colors, and pulse power demodulated and presented as binary or visualization data.

Figure 5:
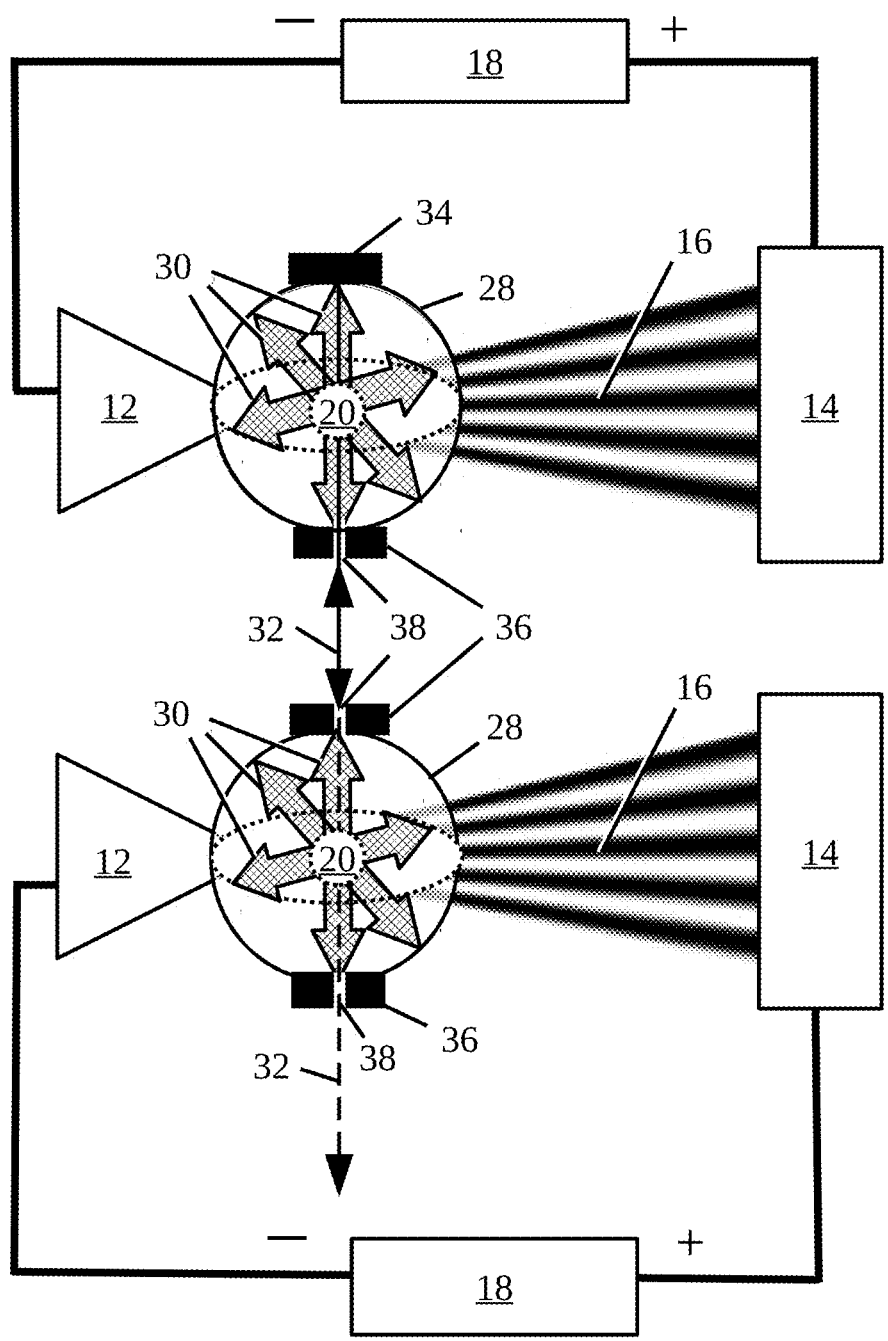
FIG. 5 is a diagrammatic view showing linked linear resonance chambers of the invention.

Referring to FIG. 5, two Trichel pulse generators with spherical resonators or reflectors 28 are arranged to focus centrally on and resonantly stimulate selected regions of glow regions 20. Take off mirrors 36 each have an opening 38 through which a take off beam 32 passes with mirror 34 terminating this combined TPG resonator embodiment. In this embodiment, glow emissions 20, which as noted may be amplified by resonance photons 30 within spherical resonators 28, are passed through opening apertures 38 in take off mirrors 36 and share a common laser beam 32 path. Any number of such spherical resonators and Trichel point generators may be provided and can be correlated to provide varying colored laser beams 32 for loading and unloading optical pipes, telemetry of constituent chemical information, or RGB color rendering for viewing.

Photonic emissions from peripheries of the glow region 20 will 'walk' around interior of reflective spheres 28 in a plane of their emission direction and first reflection, repeating the spherical 'walk' around in about n reflections or less for G diameter glow 20, D spherical 28 diameter: n=Pi×G/D. (Pi==circumference/diameter of sphere 28). In other words, a large Trichel pulse glow 20 G dimension and relatively small D spherical reflector 28 diameter means that large numbers of reflections n are required for photon energy emitted near the periphery of glow 20 to walk around the interior of the resonance sphere back to a point from which they originated or on average to output take off aperture 38. Random emissions distributed volumetrically and somewhat spherically from region 20, depending on color, throughout region 20 providing randomly emitted direction planes defined by such walking will be more stimulated regions due to multiple 'n' walking passes when walked to the exit take off aperture 38, maximized at spherical center. Large numbers of reflections n allow greater amplification delay and more TPG pulses integrated before 'walking' out the laser take off 38. In phase energetic stimulation resonance 30 is increased as pulses amplified by 'walking' laser stimulated amplification phased with the further TPG pulse stimulation and emissions provides peak amplification with n near 150 reflections providing G/D=about 50. This pertains for all wavelengths within resonators 28 as mode locking triggered TPG emissions sum in energy but not in phase as the bulk of glow 20 acts as variably saturated absorber with varying stimulation ratios with radius, a radially distributed saturable absorber providing Q-switched absorption gradients for mode locked energy providing very short high energy pulses under some TPG embodiment scenarios.

At this point, reflection and transport inefficiencies (thermal, stimulation, and coherence loss) makes further reflections less useful as molecular and atomic rebound retain more and more of the input TPG energy as it integrates by mode lock to higher stimulated energy densities. Optimizing amplification in this example provides an power mode-locked amplification factor of about 50 for a single Trichel pulse or specific region of a Trichel pulse as maximal output laser power integrating from such regions across TPG glow 20.

Inverted conditions with large G glow 20 diameter and relatively small D reflector 28 diameter, for example with G=1 mm and D=10 mm then n=0.1×Pi or about 0.31 resonances per cycle around the resonator. With less than one resonance per circuitous planar 'walk', the peripheral glow 20 random directional energy emission is reflected from spherical resonator 28 such that n about 0.31=reflections occur internally before the first concordance with the original peripheral extreme of emission 20. As the center of pulsed glow 20 is approached by a 'n' walking peripheral emission 20 reflection, the emissions all walk differing multiple crossed paths around the sphere 28 repeatably stimulating and re-stimulating (mode lock) TPG electron stimulating further glows 20 providing extreme energy bandwidths for photons so amplified in negative emission integration to beam 32 energy outputs as mode locked phase spread arbitrarily narrow pulses. Not obvious is that the center of glow 20 walks 1 pathways to spatial coherence providing essential Q-switched amplification with radial mode locked radial stimulation gradients gathered within glow 20.

In simple words, the glow 20 emission from TPG electron energy gradients stimulating plasma dynamics spreads outward randomly spherically to resonator 28 and retro-reflects resonance energy 30 back to a later mode locked TPG stimulated pulse glow 20. This spherical reflection conjoins mode locked phased further TPG pulses as both electronic and preceding pulse photonic stimulated gas distributions spherically photo-stimulated to central glow 20 concentric maximum as radially distributed passive Q-switching. Overlaying additional TPG electron gradient stimulation profiles across glow 20 spherical 28 as mode locked phase frequencies which correlate or combine with specific TPG generated frequencies optimized for maximal colored phased amplification from the center point as particular color emitting regions of TPG emissions. This embodiment provides the most signal to noise amplified lines from along the TPG gradient. Simply, those relatively earlier TPG emissions 20 which spherically 28 center mode lock and correlate or combine or lase with freshly produced spatially color-distinct regions of later TPG glows 20 provide very high color separations, narrow pulses, and pure coherencies with high energetic phase coherence lengths and directional control providing better controlled intensity propagation efficiencies and multi-colored signal interlacing with coherent switching at greater rates.

The linked linear resonances 32 of FIG. 5 of two similar Trichel pulse generators and spherical reflectors 28 may each emit a specific amplified resonance color beam 32 from the shared linear resonance pathway for beam 32 as shared linear propagation. Multiple TPG emission glows 20 directing as mixed colors, for example RGB, wherein each linked TPG emits a specific color intensity which integrates to RGB pixel intensity directed energy beam 32 providing RGB information in a single beam 32 replacing a set of RGB pixels or other colors for light pipe encodings, color viewing, and transmission.

Spacing of the two Trichel pulse generators may be at a distance that is a resonance multiple of a selected emitted wavelength so that beam 32 is dual color selectively mode lock amplified. Also, there could also be a zero spacing so that mirrors 28 of two adjacent Trichel pulse generators are tangentially connected with an aperture 38 connecting each other, or a single mirror 36 may be common to both generators coupled by aperture 38.

Figure 6:
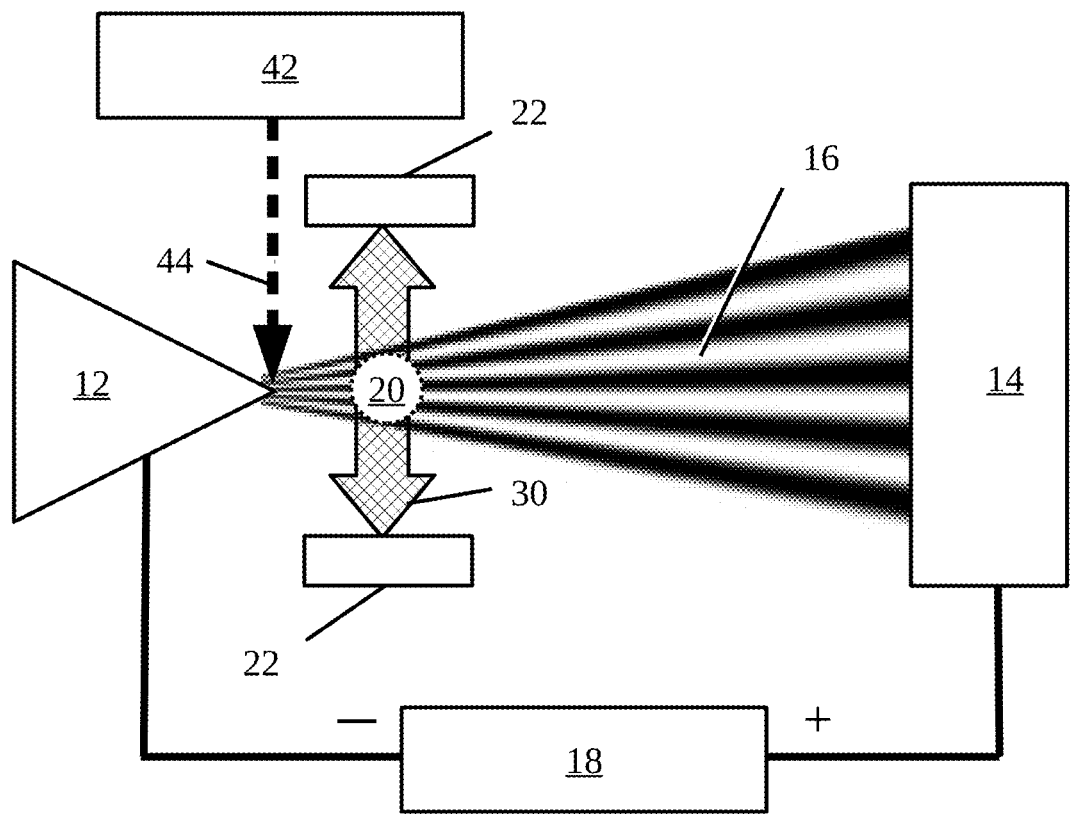
FIG. 6 is a diagrammatic view of apparatus for externally triggered formation of Trichel pulses.

A triggered Trichel Pulse generator is illustrated in FIG. 6. Such triggering is desirable for various timing purposes in order to develop or cause a Trichel pulse at a precise time or at precise intervals. In this case, voltage source 18 may be configured to apply a potential to electrodes 12, 14 that is just below a voltage that otherwise would cause Trichel pulses, with a source of external trigger stimulus 42 applying the external trigger stimulus 44 either to the tip of electrode 12 or to the gap between electrodes 12, 14. In this latter instance, trigger stimulus 44 may be directed to a region of the gap very close to the tip of electrode 12, such as a few or dozens of microns from the tip of electrode 12. In other embodiments, a trigger stimulus may be applied directly to electrode 12, 14. In any case, trigger stimulus 44 is configured to either cause an instant breakdown of the dielectric gas or other materials between the electrodes, or otherwise cause an instantaneous electron cascade to be emitted or drawn from the negative electrode 12. Trigger source 42 may accomplish this by emitting matter such as ions or other atomic particles, coherent or incoherent photons, a potential or potential energy gradient such as a voltage spike from power supply 18 that is superimposed on the gradient voltage which as noted is just below the breakdown potential or an external magnetic or electrical field generated by source 42. Other forms of energy may also be used, such as sonic or thermal pulse energy. Any of these serve to stimulate the point of electrode 12 to emit electrons and create a Trichel pulse glow 20. Significantly, timing of triggering may be made to coincide with resonance frequencies of other linked Trichel pulse generators as shown in FIG. 5, or to amplify or degrade specific color intensity of beams reflected by resonator mirrors 22.

Arrays of micro-sized TPGs provide far superior performance than a digital camera pixel by using light from an acquired image to trigger discrete TPGs of a sensor array of TPGs. Any data photonic emission or scattering from a scene (a picture) focused on an array of micro-sized TPGs triggering TPGs of the array in relative accordance with a number of photons received for each TPG as the light decreases to less than 10 photons per nanosecond, second, or coherence, providing photometric energy triggering across 1 billion fluence levels ranging. Each TPG supply voltage level, gap materials, and point electrode 12 surface materials determines relative sensitivity to input data photon triggering and the TPG pulse triggered rate during sustained high intensity data photon triggering slowing to photometric low light limits providing no triggering of TPG pulsing.

The TPG high triggering efficiency, rates, and colored efficient laser emission pulsing for information transfer requires far less power than existing transmission amplification switching technologies, providing advantages such as portability and power savings to computing and display devices.

Figure 7:
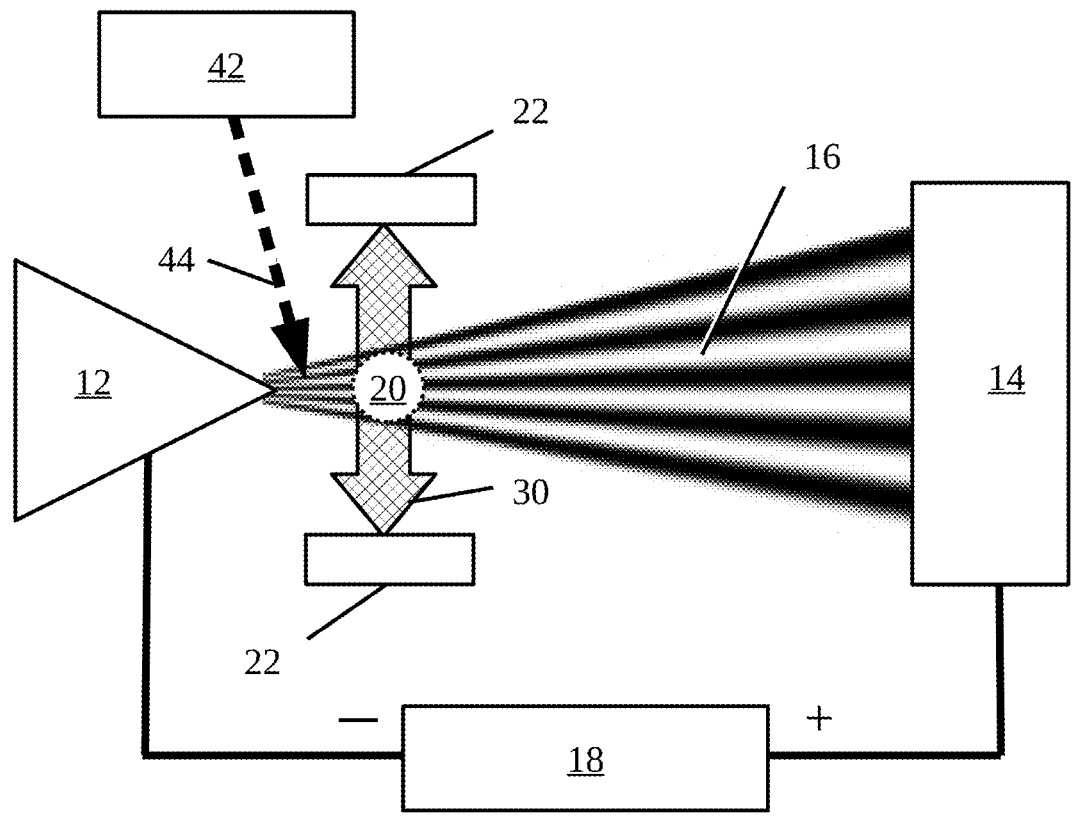
FIG. 7 is a diagrammatic view of apparatus for gap triggered formation of Trichel pulses.

Similar to FIG. 6, FIG. 7 with gap material ionizing energetic trigger 44 applied from trigger source 42 providing plasma charged species and energetic conditions within the gap which precipitate the TPG pulse, phased or not with previous Trichel Pulses. Gas phase triggering is provided by matching the quantum energy of the triggering energy 44 identically with electron ejection ionization levels to ionize matter within the gap providing further accelerating gap electrons for triggering cascading TPG emission as opposed to FIG. 6 providing photoelectric or ablation to trigger the gap from the surface of point 12.

Figure 8:
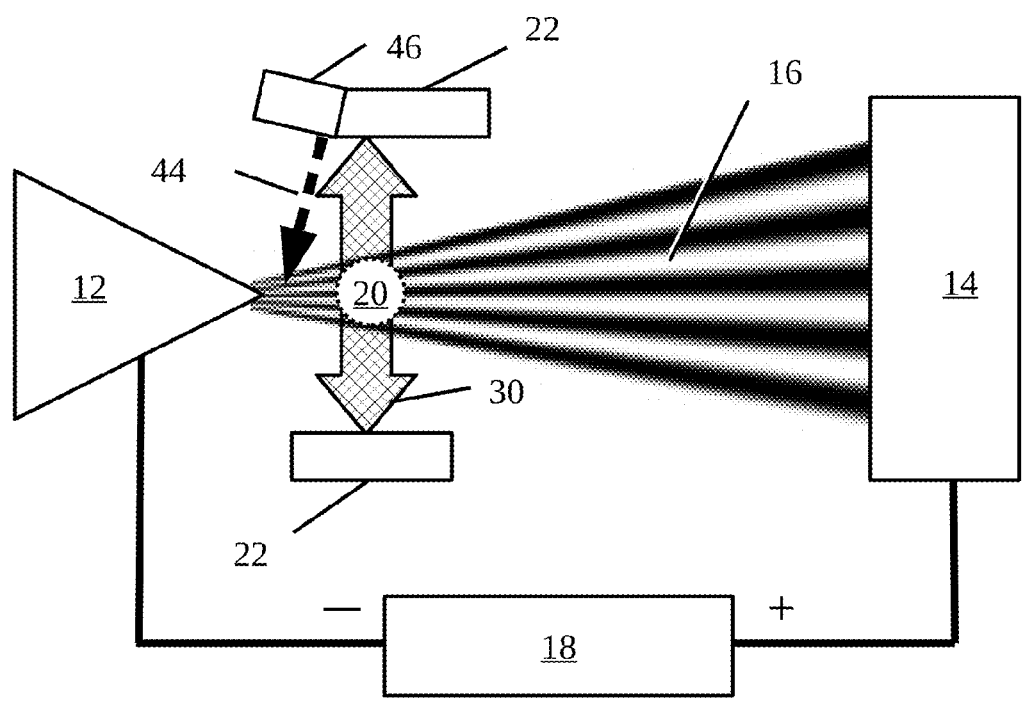
FIG. 8 is a diagrammatic view of apparatus for auto triggered formation of Trichel pulses.

FIG. 8 diagrammatically discloses self-triggering mode locking of Trichel pulses wherein resonance 24 pulses are partly diverted from the resonance 24 pathway by take off mirror 46. The diverted portion is then directed to the tip of electrode 12, the gap just adjacent to electrode 12 or both, triggering another TPG pulse in phase locked repeating TPG mode. A distance that take off mirror 46 is spaced from electrode 12 or the region just in front of electrode 12 may be selected to be resonant with or filtering preferentially specific colors within emissions from glow region 20 providing selective color phase locking effecting the entire pulse timing preferentially. As such, a train of self triggered Trichel pulses may be generated that each produce similar resonant frequencies or specific phosphorescent resonance 30 outside the time of the major emission glow 20. This is providing mode locked coherent output for a specific frequency (coherent frequency mode lock) and generically power mode locking to many TPG pulsewidths and frequencies distributed about the maximum power mode lock pulse. This is independent of emission line frequency, selectively triggered by dominant line energy mode lock triggering, nitrogen for atmospheric stimulation, or other photon compositions of applied TPG pulses.

Figure 9:
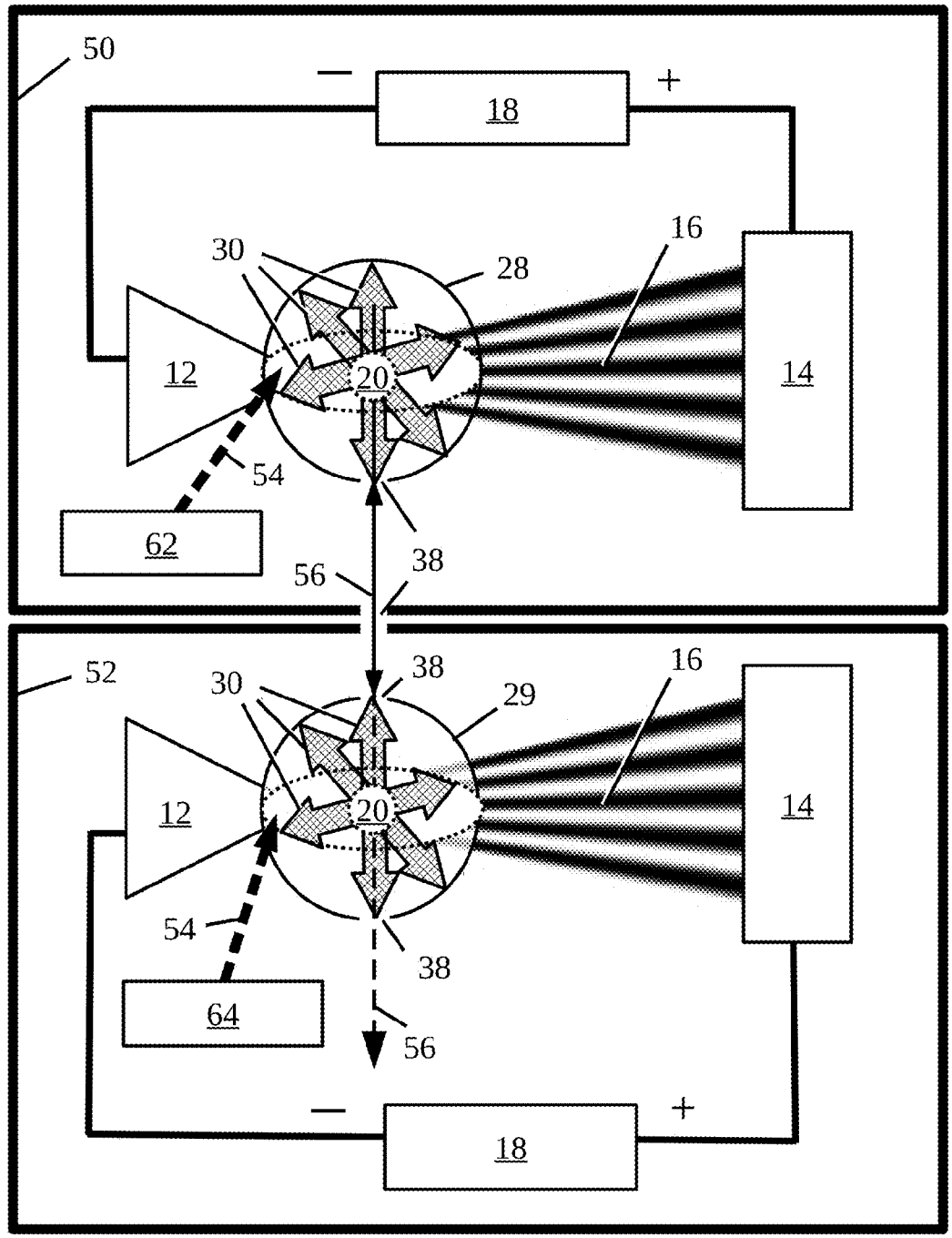
FIG. 9 is a diagrammatic view of apparatus for triggering of mode lock linear resonance from Trichel pulses.

FIG. 9 discloses an embodiment in which phased triggering of multiple Trichel pulse generators 50, 52 is accomplished with TPG pulse triggering 54 sources 62, 64 as selective and related timing and energy pulses externally applied. The diameter of spherical resonator mirrors 28, 29 and also their respective separation path-lengths along beam 56 are each provided equal to the same or differing integral fractions or multiples of chemical and color specific line wavelengths, some of which are radio frequency, for mode locking within respective TPG power pulses. Pulsed glow 20 mode locking and frequency mode locking from discrete colored regions within glow 20 act both to integrate resonance stimulation energies 30 and emit mixed phase and color laser beam 56 pulses. This allows pulse relative phase correlation between generators 50, 52 as the resonances 30 within the spherical reflectors 28, 29 remain in relative phase determined by the path length propagation delay of laser beam 56 between mirrors 58 and 60 along beam 56. Additional Q-switching is provided through selectable transparency beam 56 take off ports 38 as generic pulsed propagation providing TPG pulse correlation and compression between the two or more TPGs 50, 52. As stimulated resonances 30 within the spherical reflectors 28, 29 which remain in independently triggered 62, 64 selectable TPG pulse 20 phase with mode-locked narrow band pulses overlaying with light transportation delay due to a path length of laser beam 56 between mirrors 28, 29 with many Trichel pulse generators 50, 52 triggering in and out of phase. In this manner, multiple Trichel Pulse generators 50, 52 can be linked to pulse synchronously or asynchronously as trains of pulses with phase differing by path differences between resonant energies 30 of the spherical resonators 28, 29 and the pathway for beam 56 in between differing triggered 50, 51 Trichel pulse glows 20. Interference filtering in this embodiment may be employed to resonate, compress, or modulate one or more wavelengths of interest as a spherical emission or linear beam by selecting or altering a length of resonance paths of mirrors 28, 29 or separations thereof to be integral fractions or multiples of the wavelength or wavelengths of interest as frequency mode locking TPG beam 56 pulse emissions. Thus, specific wavelengths are optimized separately or in concert with any other similarly coupled resonances whose path-lengths are multiples of TPG emission wavelengths. Similarly, path-lengths with half-multiples or resonantly less than a full multiple of TPG emission wavelengths are variably attenuated in phase mode lock. This energy is still amplified by the integration provided with TPG power pulse mode lock in widening time coherence providing amplified broadening energetic bandwidth TPG pulse widths which propagate with shorter lasing lengths such that coherence is lost quickly. This allows use for direct viewing of laser beam 56 without accruing fovea damage. Triggers 62, 64 are directed to trigger 54 Trichel pulses in two separate Trichel pulse generators 50, 52 respectively and independently. If trigger 62 triggers in phase with trigger 64 (or is self triggered as described), the TPG pulses resulting will amplify both Trichel pulse glows 20 in phase with further in phase pulse glows 20. Further amplification and stimulation feedback within laser beam 56 pulses from power mode locking in phase triggering 54 when as shown the separation of the glows 20 is an even integer multiple of the spherical 28, 29 radii. This provides at least 2500 times the Q-switched pulsed instantaneous power output of each single TPG emitting randomly with no triggering 54 coherence. Out of phase operation of triggers 62, 64 will provide commingled laser pulses of beam 56 formed by timed Trichel pulses as triggered by triggers 62, 64. Complex frequency mode-locking control is utilized to provide specific line strengths for chemical identification and enjoyment of RGB primary color encoding and emissions. When two or more TPG with different resonator 28, 29 dimensions and different separation are triggered differentially as phased triggers 62, 64, the altered TPG pulse frequency mode locking of the first TPG 50 trigger 62 is passed to beam 56. This pulsation couples via beam 56 with stimulation within second triggered 64 TPG 52 coherence 30 modes but phased by the triggering of trigger 62. These mixed modes resonate relatively independently between TPGs 50, 52 during beam 56 stimulation without beam 56 energy removal by Q-switched (not shown) or common mode differential coupling with reflectively shuttered (not shown) port 38 opening to allow pulsed beam 56 to exit the resonant system as beam 56 shown as a broken line. Frequency locked beam 56 provides very high fluence pulses made available with envelopes of less than ps (picosecond) interlaced with traveling mode degraded amplitude coherence. Phase controlled multi-mode locked frequency and power amplification provides very high dynamic range fluence pulsations. Users can control the TPG 50, 52 separation path length dynamically (not shown) as integral or less multiples of TPG emission wavelengths. Temporal mono-frequency pulse widths down to fs (femptoseconds) with GW (gigawatt) fluences are obtained with just a few compact efficiently produced and multi-mode locked TPG coupled emissions. It could be dangerous to spectators. Multiplexed encoding by time series differentially phased triggering 62, 64 of optically ganged TPGs 50, 52 integrated beam 56 emissions interlaces two data streams into one propagating beam 56 providing many extensible colors and coherent power mode locked TPG pulses interlaced for transmission as data. In fact, power and frequency modulation are conjoined within a single fiber pipe by providing fast high amplitude Q-switched pulses separable from wider bandwidth power TPG pulse mode locked power pulses.

In addition, automatic passive Q-switching is provided by resonant stimulated energy 30 uneven distribution in space within resonators 28, 29. The glow 20 region is not isotropic in stimulation ratios and tend to be maximum at spherical center and tend to drop off radially with the inverse of the cube of the distance from center. As the spherical resonances 30 oscillate in mode lock within spheres 28, 29 the stimulation energy density remains largely within the glow 20 region. This is due to both energy density radial fall off as the glow expands volumetrically to reflection with lesser photonic energy density and fluence and also is due to the mode locked TPG energy emplacement centrally within resonators 28, 29. As the stimulated states gradient is largely decreasing radially from center with spherical TPG pulse mode locking after the first pulse and beam 56 is shown orthogonal to and centered on the TPG gradients in this embodiment, the Q-switch pulse amplitudes will not be gaussian, but rather non-maxwellian in direct TPG gradient response providing a non-maxwellian color, phase, and fluence cross-section across beam 56. Maximum compression occurs at beam center in both phase and amplitude, dropping off centered as at least one over the beam radius cubed as above in both phase and fluence in non-homogenous stimulation density passive Q-switching.

FIG. 10 diagrammatically illustrates an enlarged view of a Trichel pulse generator 68 with electron energy gradients 66 within glow region 20 with polarities and power supply assumed as before. Mirrors 22, 70 may be spaced at TPG pulse mode lock frequency resonant distances from electron energy gradient 66 within the electric field gradient 16. As noted above, quantum electronic stimulated emissions from region 20 are emitted from field gradient 16 as a function of electron energy as the electrons are accelerated from left to right providing the electron energy gradient 66. Gases or other dispersed matter introduced or present in field gradient 16, and by way of example only, may be oxygen, nitrogen, carbon, and hydrogen or any dispersed matter.

With these materials present in the gradient, oxygen would emit including invisible 1270 nm infrared light near the base of gradient 66 arrow or early in a Trichel Pulse as the highest energy electrons at this time point in the gradient possess sufficient requisite electronic energy 0.98 eV to stimulate oxygen emission. Further along arrowed energy gradient 66 electrons gain 1.88 eV energy stimulating Hydrogen alpha at 658 nm red 72 emissions. Toward the middle of the gradient 66, electrons have been accelerated to an energy level of 2.42 eV so that the dicarbon vapor (only exists above 3500 C thermal) is excited and emits 513 nm green 74 light. At the rightmost end of the gradient 66 many electrons have gained 3.68 eV from field gradient 16 and there and then excite atmospheric nitrogen (if present), and emits including 337 nm, which is violet blue 76, almost UV light. Vaporized boron or argon gas amongst many others also provide predominantly blue emissions amongst many others.

These colors are exemplary only surrogates for primary colors such as RGB for mixing and forming any other color, and are separated in location by electrical gradient 66, although Ir, RF, and UV require specialized visualization. While these emissions are in theory homogeneous in direction, those quanta which are orthogonal to gradient 10 form red, green and blue TPG stimulated emission laser beams 72, 74, and 76 respectively, having been reflected in resonance between mirrors 22, 70 and emitted through openings or windows in mirror 70. Each gradient 66 orthogonal emission point coherence within glow 20 obtains identical resonance times as travel to mirror 22 and back then to mirror 70 and back summing to identical integral wavelength multiples for specifically amplified resonance wavelengths. For RGB mixed colors, no frequency mode locking is required or desirable for safe viewing and TPG resonance is designed to avoid it. Only TPG power pulse 20 mode locking or direct emission is utilized in amplification for mixed color resonances providing visual colored aesthetics or other information or energy transfer avoiding power damage.

Figure 11:
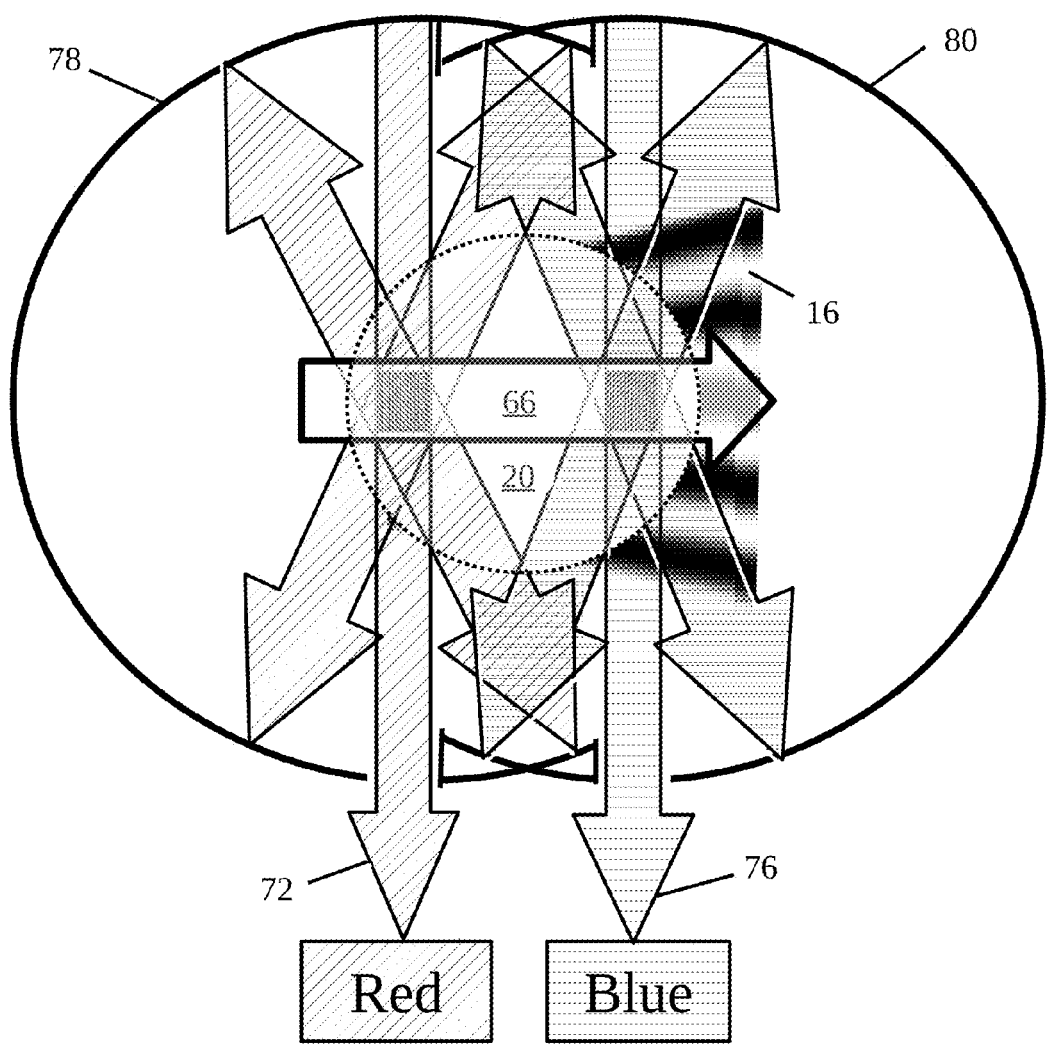
FIG. 11 is a diagrammatic view of apparatus for producing spherical color amplification within Trichel pulses.

As shown in FIG. 11, separate partial resonator spheres 78, 80 which may be partial spheres and etalons in some embodiments, are centered on each differing color emission regions, such as sphere 78 focusing a red 72 emitting region, and sphere 80 focusing a blue 76 emitting region (green not shown for clarity). In this instance, each sphere may be optimized in diameter so as to most effectively resonate and greatly amplify a selected frequency of emitted light with frequency mode locking at the resonant diameter of spheres 78, 80 after or along with generic TPG triggered pulsed selectively broadband energy mode locking.

Spheres 78, 90 overlap providing selective frequency integral wavelength mode locked partial spherical reflectors integrated together and optimized for differing red 72 or blue 76 or other color emission from shared focal gradient 66. Amplification energies as separated partial spherical frequency mode locking as fast color pulses provided on top of or relatively phased with wide bandwidth fluorescence power mode locking pulsations.

In FIG. 11, the red and blue spheres 78, 80 intercept as shown and trace a circle in 3D of interception provided they share the focal distance along gradient 66. One or both spheres 78, 80 partially extending and so partially shading, or occluding the other is providing means for controlling relative emission intensities by controlling the relative shading of the subject colors. Internally, each partial sphere propagates the energies at the corresponding color reflecting spheres 78, 80. For RGB three color amplification, three commingled spheres are commingled, each with spherical surface to glow 20 sufficient to provide desired stimulation and mode locking. Essentially energetically equivalent but without damaging fovea stimulation as current RGB pixel groups is provided from a singular TPG glow 20. Modulating colors 72, 76 relative and absolute intensities by controlling solid angle adjustable reflective pulse resonators and controlled (not shown) apertures exiting the spheres 78, 80 as emission beams 72, 76. In some instances, almost complete spherical coverage for one of the RGB colors may be required for sufficient emission energy at that color while the others more energetically emit and so require less amplification from mode locking, Q-switching, and 3D resonant coupling. Many billions of colored emissions with nearly unlimited relative intensity variations can be generated.

Delayed stimulated emissions due to phosphorescence may also form mode locked pulses that are off-phased from the bulk TPG pulse emissions by the phosphorescence vibrational and other stabilization delayed emission from TPG electronic stimulation. For very low concentrations of phosphorescent materials this off-phased mode locked and Q-switched spherical resonance out of phase with the bulk of the mode locked TPG fluorescent and spontaneous emission power separates the pulsed mode locked energies in time within the output beams providing significant improvements in signal to noise for identifying chemical-specific emission lines. In this case, approaching 10% quantum efficient photometry provides PPB molecular or atomic population densities providing amplified phosphorescence signal to noise resolution from within glow 20 with as little as a single ns TPG resonating pulse.

Spheres 78, 80 may be made of dichroic filters, etalon filters, selective absorbers, or the like for specific color transmission, absorption, and reflective characteristics especially to remove or preserve troublesome or valuable emissions such as UV or high intensity lines. Removal of high energy photons from resonance provides effective positive absorption stimulation TPG emission pulse mode lock without attendant damage escalation and with significant signal to noise enhancement for unattenuated colors. In other embodiments, different glow regions 20 can be optically sampled in this manner to accentuate positive amplification of specific timed spectroscopic emissions 72, 76 depending on the material in glow region 20 and the location within energy gradient 66.

These other embodiments may include micromirror devices such as found in digital light processing projectors, and would be used to collect light from specific regions of glow region 20. Here, an array of micromirror chips may be configured in a generally cylindrical or spherical array around glow region 20, the discrete chips being synchronized to each collect light from one or more specific regions of interest of glow region 66. A lens for each chip, or multiples of chips, may be used to magnify or otherwise modify light from glow region 20 for collection by the micromirror chips. Separated and collected light may be used to develop lasing as described above, or directed to a common point for analysis, as by directing the light onto a photodetector array for detection of wavelengths of interest, or for other uses. A light dump for the mirrors may be used as a trigger to reliably trigger Trichel pulses, or otherwise would be located at a non-interfering location, such as through a small opening in the spherical or cylindrical micro mirror array. In other words, a spherical or cylindrical array of micromirror chips may be used to replace reflective spheres 78, 80, and be rapidly switched to collect light of different wavelengths as shown simplified in FIG. 10. In other embodiments, a micromirror chip itself may be configured as a cylinder or sphere for collecting light from specific regions within region 20. Of course, a single micromirror device could be used to collect light from region 20, although an amount of light collected in this manner would be small. In addition, specific wavelengths of light collected by a micromirror array from glow region 20 could be used as a source of light for one or more cylindrical or spherical mirror laser devices, as shown in FIGS. 4 and 5. Here, the micromirrors may be used to collect and direct a collected wavelength or wavelengths onto a small sphere or the like located at the center of the reflective spheres, the small sphere containing material sensitive to the collected wavelength or wavelengths and which fluoresces or is otherwise excited to produce light used for lasing. The small sphere at the center of the reflective sphere may be transparent to the collected wavelengths and/or fluorescing or excited wavelengths, and the material sensitive to collected wavelengths and which may be driven to lase may be a gas, such as carbon dioxide or other gases that advantageously produce photons when illuminated by light collected from glow region 20.

While efficient, highly variably colored triggered lasers are the focus of this disclosure, much wider wavelengths may be stimulated along gradient 66 outside of the apparent glow 20 along and displaced before and after the arrow indicating the gradient 66. Resonance shown hatched darkly for red spherical 78 stimulation resonance near the origin of the energy gradient 66 arrow indicating glow region 20 red 72 resonance for example. Further along gradient 66 and darkly hatched are similarly formed blue 76 resonances. Infrared and UV may both be present in large amounts as molecular and atomic stimulated radiation both inside and outside of glow region 20 under certain material combinations. Undesirable wavelengths may be inefficiently mode locked, suffering high attenuation.

Alternate resonator shapes, such as a cylindrical resonator mirror 90 (FIG. 12) yield similar Trichel Pulse color amplification as in FIG. 11 but in one less radial (axial) degree of freedom as all resonances, such as red 92, green 94, and blue 96, for example, and are reflected in a planar manner and parallel as shown normal to the cylindrical axis TPG electron energy gradient 66 within mirror 90 also orthogonal to gradient 66 and centered on TPG glow 98. Red resonance 92 is shown correlating or combining near the base of gradient 66 providing in 2 dimensions for a circumferential take off slot 100 or parts of slot 100 for providing restricted planar emissions if desired, or otherwise using take off openings 102 for point or linear emissions. Conical and complex shapes for a resonator 90 may be used for shaping and modulating amplitude of the beams in three dimensions, particularly for pulse maxima.

In some embodiments, a plurality of negative TPG electrode points arrayed along a flat surface within cylindrical resonator 90 provide a real amplification and mixed phase stimulation among the many corresponding glow regions, one glow 98 region for each point, similarly trending as gradient 66 capable of emitting colors at will on the 2D plane defined by slot 100 radial emissions from red resonance 92 which in some embodiments may be selectively shuttered to limit areal extent.

This provides a planar laser surface for each of red 92, green 94, and blue 96, each of which may be picked off as a planar coherent emission or a linear beam respectively as with slot 100 or selectively opened and iris controlled (not shown) aperture take offs 102 for each color. The cylinder 90 diameter only effects TPG pulse mode locking rates as integral fractional propagation times between TPG pulses 98 which is adjustable with controlled triggering rates as before. Specific integral wavelength cylinder 90 diameter provides mode-locked amplification during the main TPG emission pulse or during delayed phosphorescent TPG glow 98.

Differentials in slot 100 width and circumferential extent, the size of beam take offs 102, gradient 66 coloration, TPG pulse rates and fluence, and TPG materials may be utilized in producing and directionally controlling TPG pulsed laser energy for any practical applications such as laser cutting and etching, genetic research, data transfer, or other which may be along fiber optics or in open space and as pixels displaying images.

Any laser wavelength emissions allowed by material electronically stimulated transitions may be used by providing energetic gradients 66 that stimulate and emit laser wavelengths of interest in TPG glow regions. By way of example, for television viewing, hydrogen alpha would provide red 92, dicarbon would provide green 94, and dinitrogen would provide blue 96 for integrated RGB encoding. These or other materials may be provided to a plurality of glow regions, each corresponding to a pixel or the like of a display. These laser emissions are then directed for entertainment or informational purposes. Emissions are phase, coherence, and intensity modulated so as not to cause eye damage, and filtered or optimized to prevent harmful UV emission.

Figure 12:
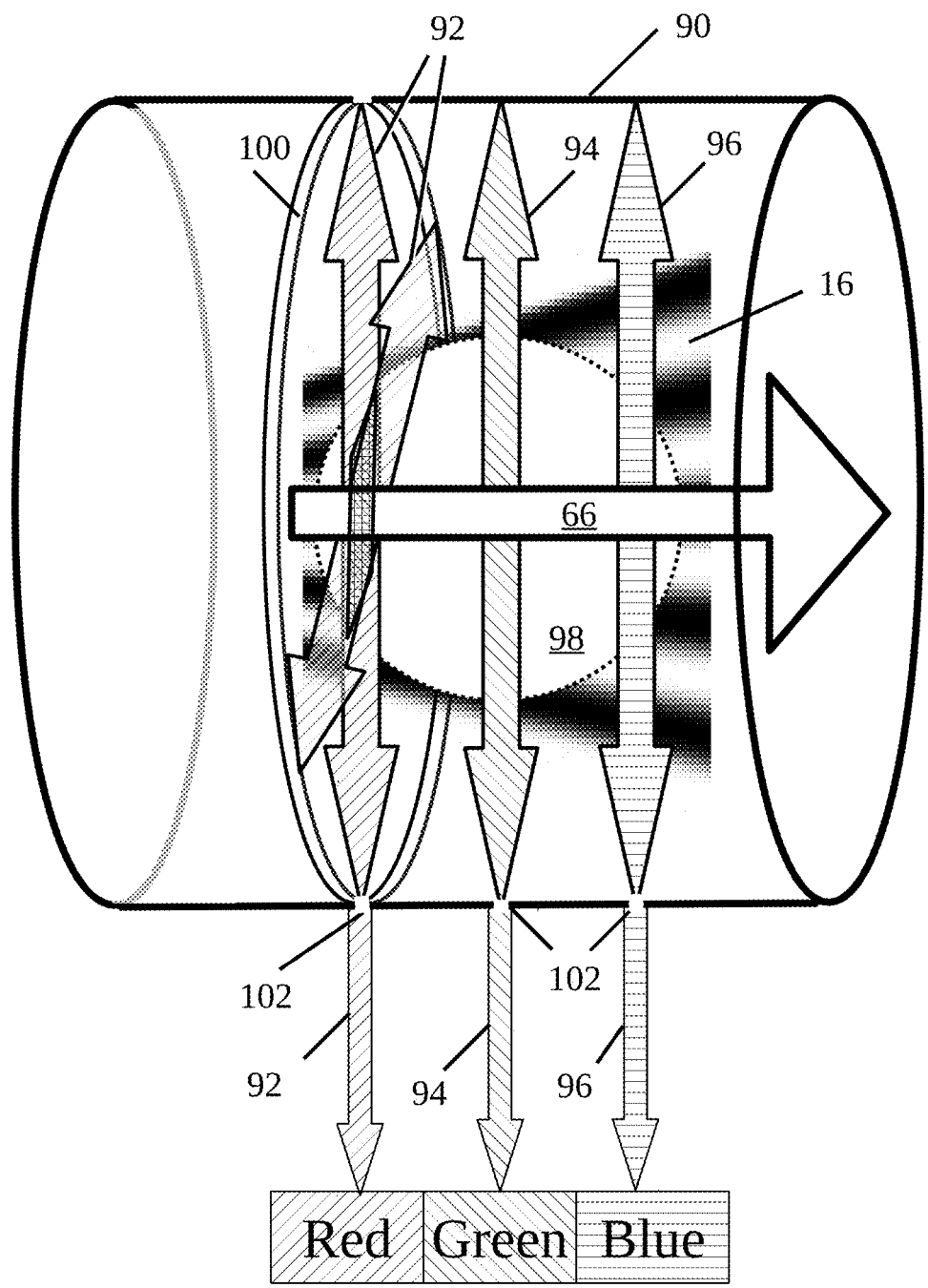
FIG. 12 is a diagrammatic view of cylindrical color-specific amplification of Trichel pulses.
Figure 13:
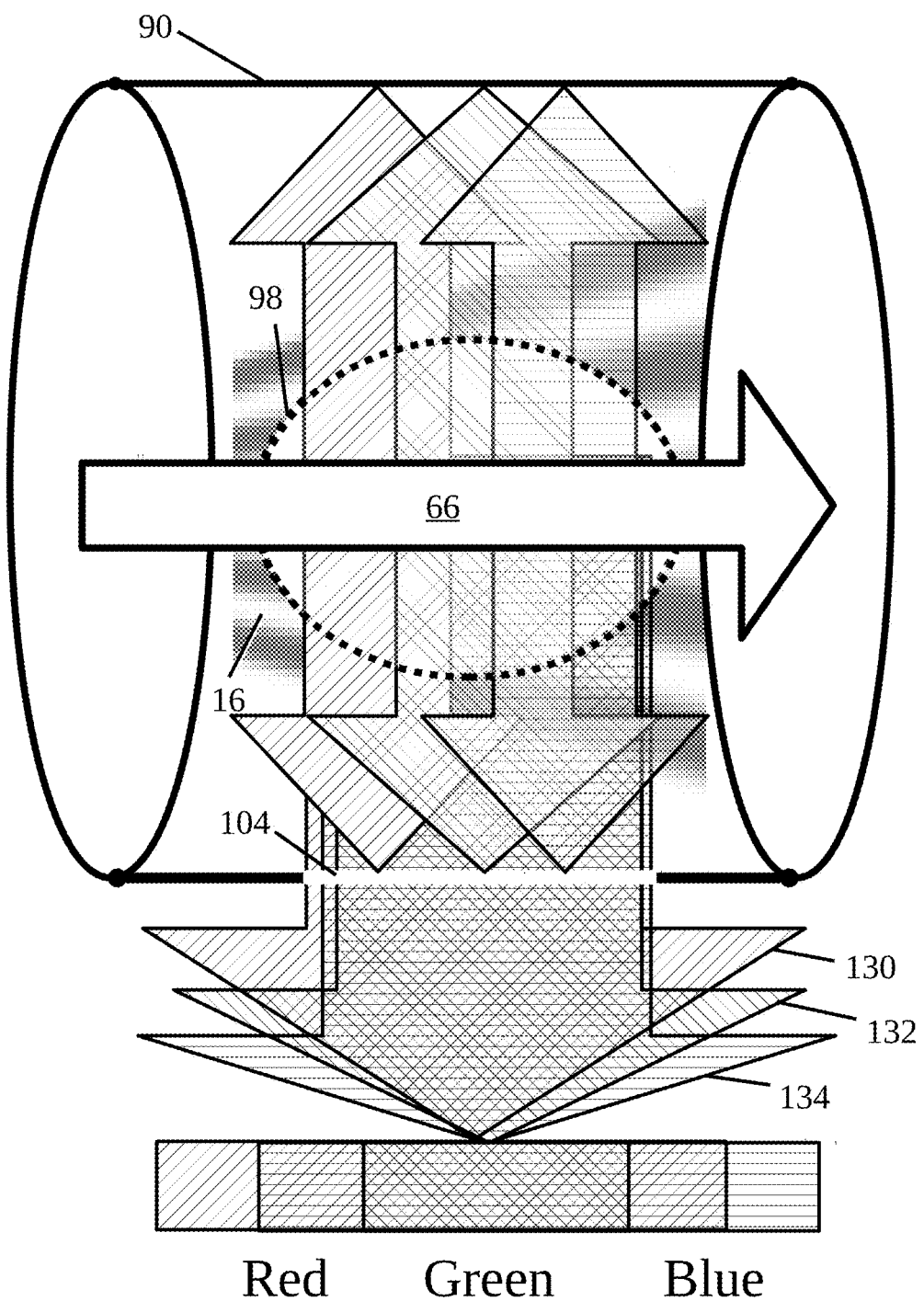
FIG. 13 is a diagrammatic view of apparatus for producing broadband cylindrical amplification of Trichel pulses.

FIG. 13 discloses somewhat continuous broadband cylindrical amplification wherein emission colors are differentiated in color-specific spatial gradients 66, as in FIG. 12, and also as mixed laser emissions from axially aligned take off slot 104, or any desired shaped slots in resonator 90 trending along the Trichel Pulse axis 66. Such an embodiment emits continuous resonance emissions of red, green and blue inclusive of the entire emission pattern or spectrum along gradient 66 over time of duration of a Trichel pulse. This is as illustrated with FIGS. 10 and 12 but shown here as axially slotted 104 providing for 1D space, 1D color, and 1D time progression emissions as the Trichel pulse or pulses emit specifically along gradient 66. In turn, such phase complexity may be demodulated with multi-color triggered TPG receivers encoded with phase continuity and correlation from the Trichel Pulse generation rate. In other embodiments, dichroic, dye, or gel filters may be used to separate red, green and blue wavelengths.

This provides a planar laser surface for commingled red 130, green 132, and blue 134 which may be picked off as a mixed color planar beam from slot 104 which may be selectively blocked or shuttered to vary the color mixture and intensity emitted (not shown). As the emission is pulsed at the TPG triggering rate for mode locking TPG pulse power, all the colors will TPG pulse rate mode lock to some variable extent no matter the diameter of cylinder 90 as TPG triggering can vary pulse rates to optimize TPG pulse mode locking and resonant coherences.

As the repeating TPG pulsing of these colored glow 98 events varies with time at each spatial location along the gradient 66, shown as resonances red 130, green 132, and blue 134, their time course evolution of relative quantum line strengths is enhanced by resonance convolution into the output beam color intensity and phase relationships, rapidly under Q-switching. This is directly related to material composition and stimulation energies available in glow region 98. The TPG supplies sufficient dynamic range in an energy gradient 66 for providing electronic stimulation for all known materials, and so their corresponding laser beam emissions at some wavelengths may not necessarily be visible before, during, or after the visible glow along gradient 66. These phased relationships of relative strengths of continuous or discrete phased color variances over the course of a Trichel pulse train, and glow emissions across the gradient 66, separate in time and space along gradient 66. This pulsed phased color amplitude information convolved with known materials or unknown analyte predictive emission lines in the gap glow region gives information about the components of such analyte as existent or not in the gap glow during pulsation, absolute quantity extant, and analytical binary positive pulse evidence of an energetic triggering attempt of a Trichel pulse having occurred or not.

Figure 14:
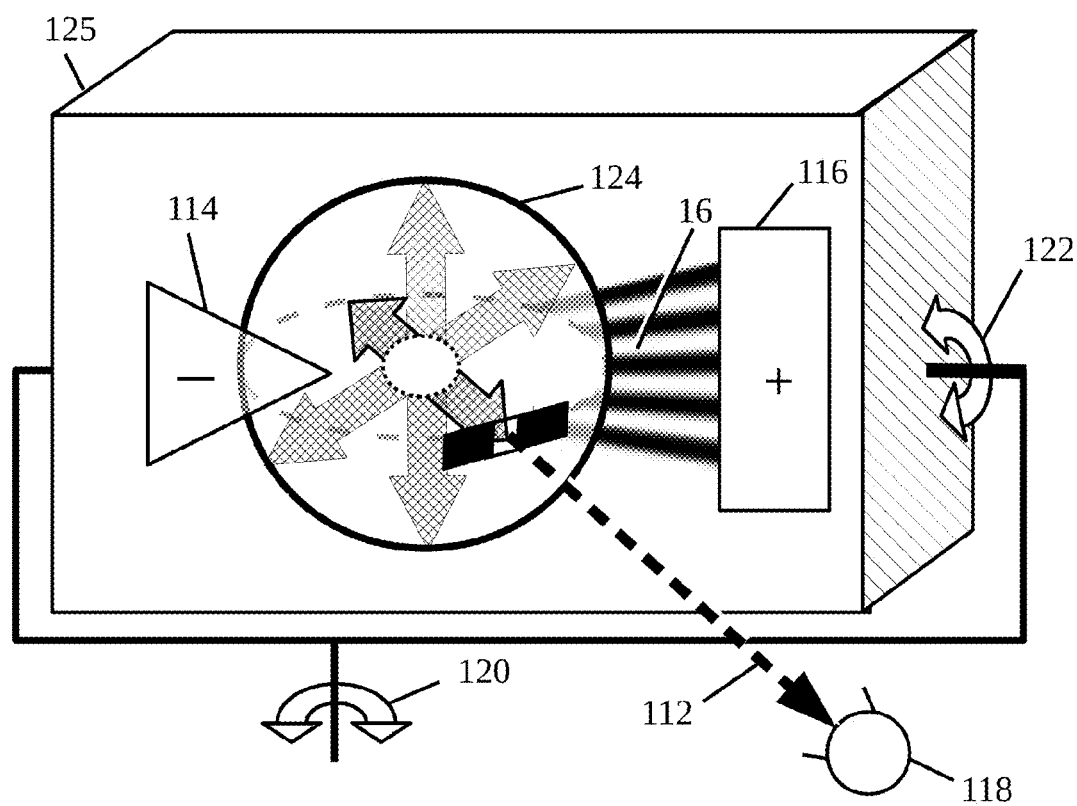
FIG. 14 is a diagrammatic view of apparatus for producing directed Trichel pulse energy.

FIG. 14 illustrates the effects of amplified glow emission as for example a red laser beam 112 from directable TPG 125. For simplicity the power supply is omitted, replaced by minus and plus symbols on electrodes 114,116 respectively. With little divergence, red beam 112 will efficiently transport red energy into visualizing port 118 by directing, as by horizontal gimbal 120 and vertical gimbal 122. This provides remote viewing or directing of selected wavelengths of glow region 98, depending on composition of matter in glow region 98. Gimbals 120, 122 may direct a generated beam in any or cyclically to multiple directions, with more take offs located so as to preferentially beam resonating energy as desired to any direction. Any color-specific TPG emissions due to material stimulated glow can be directed in this manner. In this illustrative case, matter within field gradient 16 is chosen to preferentially glow red more energetically, with other Trichel pulse generators containing materials to glow green or blue, respectively.

Gimbals 120, 122 may be driven by individual micromechanical stepper motors, fluid pressure, thermal distortion, sonic energy coupling with actuators, solar powered motors, piezoelectric distortion, bimetallic torsion, magnetic or electric fields, solenoids, mechanical levers, or cams. As noted, micromirror arrays oriented in a spherical configuration or selectively illuminated by beam 112 for controlling the direction of propagation may also be used. As noted, such arrays may be synchronized so as to reflect beams a selected number of times within reflective sphere 124 to create and amplify lasing before the beam is emitted through a take off port to control the intensity of beam 112.

Figure 15:
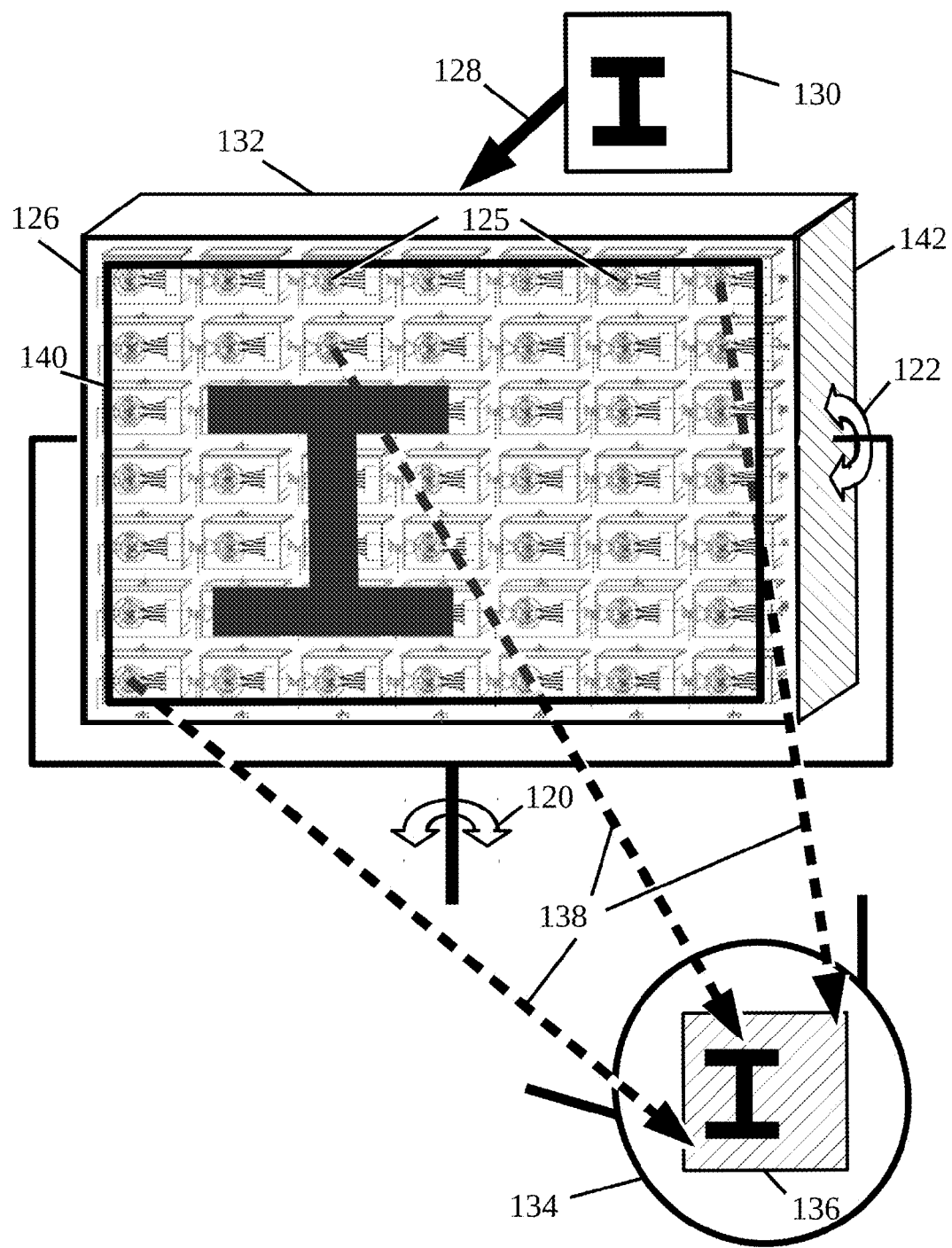
FIG. 15 is a diagrammatic view of micro-gimbaled arrays for projecting programmed color images developed from Trichel pulses.

Micro-gimbaled and miniaturized TPGs 125 as described for FIG. 14 are disclosed in FIG. 15 shown as a planar 7×7 array 126 of such TPGs 125 projecting programmed images 130 provided by input 128. This input provides image 130 as relatively distributed voltage to the array controlled by individual TPG pixels image 130 patterned by TPG current source manifold 132. Rendering to visualizer 134 as visualized image 136 is provided by the TPG emission rays 138 which are aimed individually by mechanism 142 from TPG emission image 140 shown pixel locations. This image 140 is directed via laser rays 138 provided by the individual TPG emitters 125 directing independently to visualizer 134. In this instance, each discrete laser ray from TPGs 125 would correspond to a pixel of image 130. Visualizer 134 may be a retina or other array respondent photosensor such as a digital camera chip. Colors propagating are TPG gap material controlled as colored laser beams 138 as red, green, or blue image or discrete informational emissions. RGB is programmed independently for separately aimed projection arrays 126, or pixel groups providing a color image 136 in visualizer 134 at the unique directed spatial correlation point of image 136.

Figure 16:
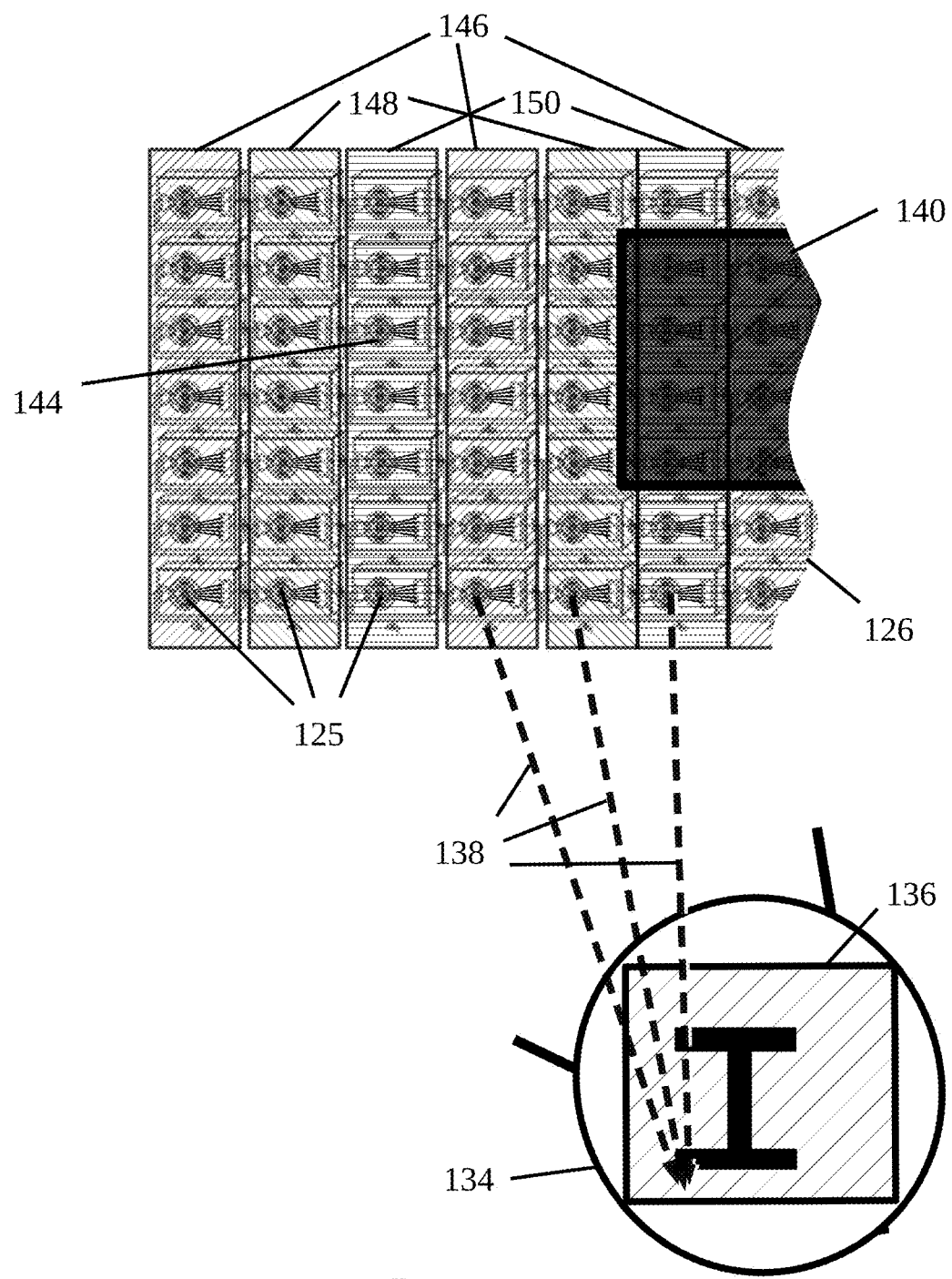
FIG. 16 is a diagrammatic view of apparatus for producing RGB correlation using Trichel pulses.

FIG. 16 exhibits much higher TPG pixel densities as double vertical and five times horizontal in aspect as an enlarged image of a lower left portion of the "I" of FIG. 15. As shown, dark portion of the "I" of image 140 is surrounded by white area 144, which explicitly demonstrates how narrow beams 138 designated R, G and B, which as noted may be laser beams generated by TPGs 125 using any of the methods described herein, are directed from discrete ones of TPG element emitter columns red 146, green 148, and blue 150, respectively, in point to point RGB correlation or spatial combination with visualizer 134. This provides RGB color image 136 when the whole array emits white in this example from pixels 125 in the generally white array area 144. As equal magnitude beams RGB encoding coalesce at a visualizer 134, white light is produced. As such, RGB beams 138 from corresponding TPG elements cooperate by directed rays 138 to form a single pixel. Similarly the three colors may be generated from 3 coupled RGB TPGs from depths of the array and all emit coherently from one pixel location more like FIG. 15 with color modulation within each pixel. All visible colors may be produced by manipulation of the TPGs 125 RGB spectral output, as noted above. In some embodiments, since the RGB laser beams are highly directional, and angular dispersion and RGB focus at visualizer 134 is unique and controllable via horizontal and vertical gimbals (not visible here), privacy and less power waste predominate as the image 136 can only be seen within a narrow angular range defined by the spread of laser beams 138 which also effects sharp focus. This may be advantageous when used as instrumentation viewing screens or the like. Wobulation is helpful.

FIG. 16 for simplicity describes three emitting 138 RGB TPG 125 pixels as a group of 3 primary colors encoded as a distributed color pattern of a pixel of image 140. Driving Trichel pulse generation potentials to an the array of directed TPG beams provides any TPG emission colors inclusive of RGB and beyond. This provides an emission pattern of image 140 of 'I' image 130 as with FIG. 15 to each TPG as sufficient potential for Trichel pulse formation indicated by arrayed directional pixel summation of RGB at a visualization device or array detector 134 rendered in this embodiment as arrayed color image 136.

Figure 22:
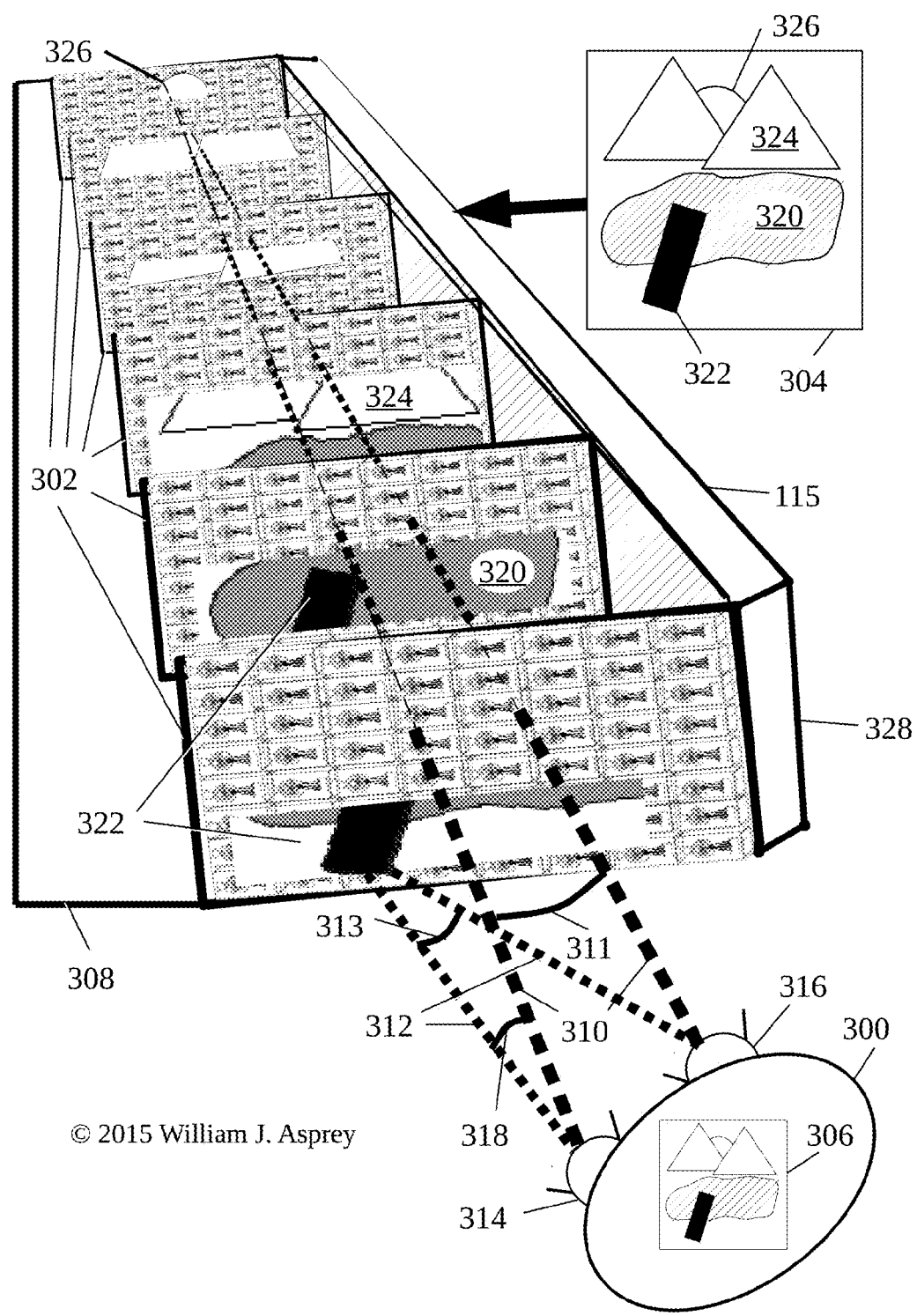
FIG. 22 is a diagrammatic view of a Trichel pulse 3D viewer.
Figure 23:
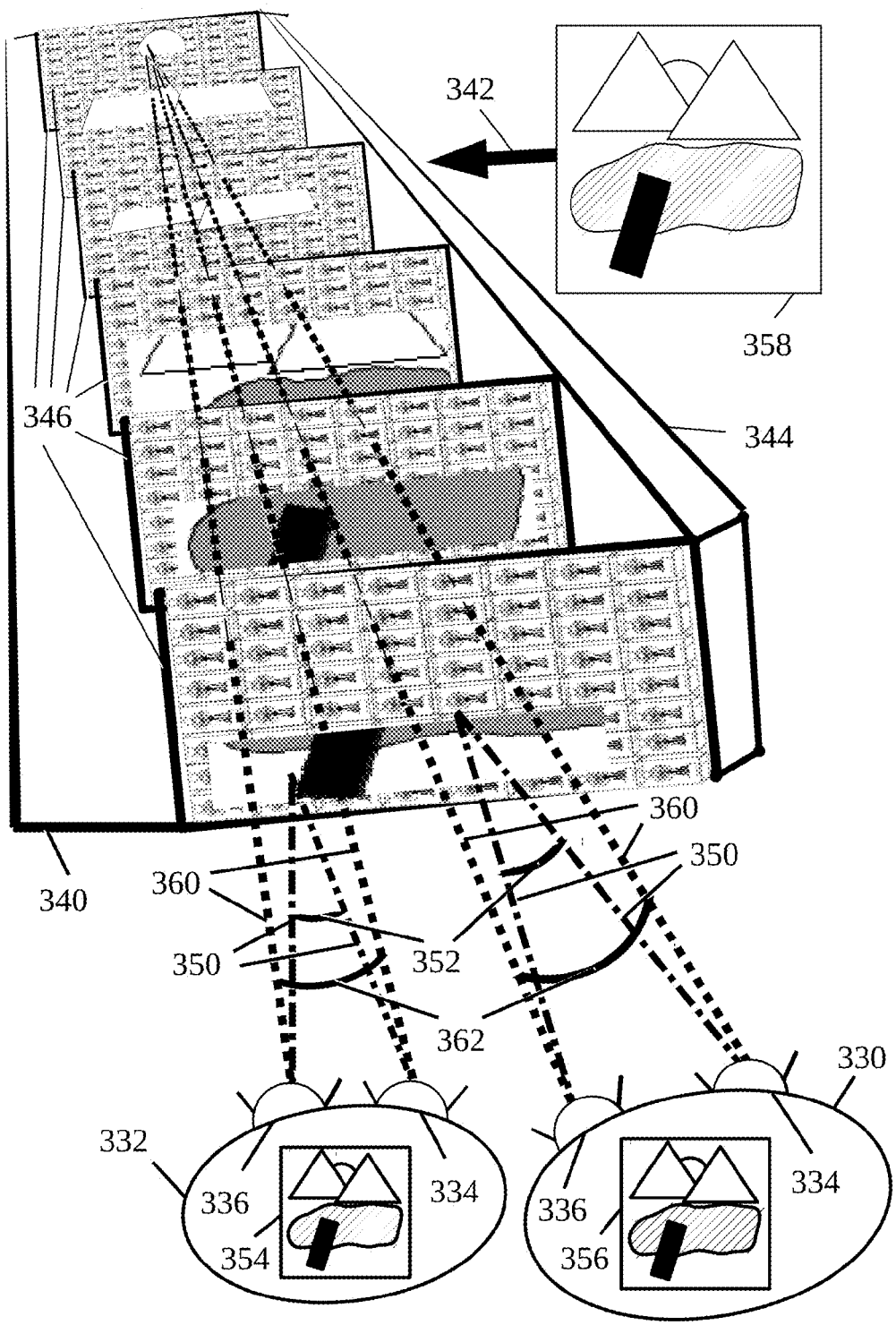
FIG. 23 is a diagrammatic view of directed flat 3D imaging for a plurality of viewers using Trichel pulses.

Synchronous or natural triggering of the array on a clock cycle triggers only TPG emission glows for those elements of the TPG array with RGB TPG triggering potential pixel patterns corresponding to image 130 of FIG. 15 impressed thereon. TPG elements corresponding to a dark region are switched "off", or otherwise have developed beams dumped into a light dump by micromirrors or the like that control direction of discrete beams toward visualizer 134 or away to dumping or other viewers. As such, images may be developed at natural Trichel pulse rates of above 1 Mhz, and as noted above, directed by any directional technology such as piezoelectric gimbals, deformable mirrors, digital micromirror device (DMD) arrays, and so forth. Due to this speed of image development, individual array TPG elements 125 may operate asynchronously without need for any scanning or interlacing of discrete beams as is found in conventional television, because 1 Mhz is far faster than needed for the human eye to see, thus simplifying design of the system and providing much greater frame rates with far less jerky frame jumps. Intensity of each beam may be controlled to some extent by controlling voltage used to generate glow regions, or by rapidly switching a beam "on" or "off", as by suppressing or not triggering Trichel pulses for appropriate periods of time. For instance, if 60% of Trichel pulses for any given TPG element 125 are suppressed, it would result in a beam of only 40% of maximum intensity. However, each element 125 of array 126 must be independently aimed at visualizer 134 in accordance with not illustrated changing features of image 136 in order to properly form changing beams 138, as these beams are directional, coherent colored beams. This can be done dynamically if the system knows where the visualizer 134 is relative to the array 126, as internal algorithms can calculate and apply individual element gimbaled or DMD corrections in horizontal and vertical directions across the array. In other embodiments, elements 125 may not need to be moved at all, with beams developed therefrom simply aimed at fixed points required for visualizer 134 and the elements either switched "on' and "off" at appropriate rates to develop required intensity and color of an image. Here, array 126 may be constructed of several layers of TPGs wherein TPGs more rearward in the array fire their respective laser beams past or even through TPGs more forward in the 3D array. Such construction would enable a higher pixel density, third dimensionality, and higher resolution images (FIGS. 22 and 23).

In this manner, data representative of image 130 is input as patterned TPG potentials, which when triggered emit respective laser colors rendering emission image 140 as propagating laser energy rays 138. These colors may be correlated and cogitated from emitters for red, green, and blue, or other renderings as expressed only as localized correlation or summation on visualizer 134 as mixed colors painted as mixed RGB colorization. Visualizer 134 must be in a correct location for beams 138 to coalesce into image 136 pixel colors with correct focus, color-specific renderings, or any light at all. Closer or further from array 126 or angularly displacing visualizer 134 degrades the correlation of rays 138 and will not form an image since the rays 138 coalesce properly in only one place entering visualizer 134 coherently.

Laser energy dithered or scattered somewhat randomly from precise locations of array 126 may provide ubiquitous 2D rendering visible to anyone in front of array 126 without severe restriction on visualizer 134 location. In some embodiments, wobulation may be advantageously applied to discrete beams, or to discrete elements 125 to sharpen images, including 3D depth rendering apparent resolution.

In other embodiments, dual RGB TPG arrays 152, with right and left eye viewpoint images viewed separately by each eye create 3-D binocular viewing. In this embodiment, two arrays of TPG emitters are provided one for each eye each provided with the imagery parallax viewpoints respectively for each eye. As noted above, one or more arrays may be oriented in a stacked configuration, with the RGB laser beams from more rearward arrays firing through more forward arrays for depths. As such, images on one array may be held stable in two dimensions, while another array provides the same image emitting with varying depth information necessary to shift the image, or portions thereof, in accordance with contextual depth information necessary to produce 3-dimensional viewing. Unlike other 3-dimensional viewing, separation of separated differing viewpoint image streams is not necessary at the user, as by actively shuttered LED or LCD glasses synchronized with switching of respective arrays, or passively as by utilizing glasses incorporating polarization filtering. In addition, interlacing image streams directing as gimbaled or DMD directly to different viewers provides different imagery and depth rendering to different users without tracking of users or shuttering alternating imagery. As a gaming tool, this is important, as well as the effective instantaneous sub-microsecond updating of images, especially for high frame rate data. The correct image is only available at angles set, by way of example only, by horizontal and vertical gimbals or other devices, such as DMD micromirror arrays or the like, to deliver RGB and other beams to correct, selected, and specific points on visualizer 134 or others. The confluence of controlled-intensity laser beams RGB creates a palette of more than billions of atomic and molecular stimulation emission colors that easily support color depths of 1024 shades (10 bit) per primary color at MHz refresh clocking rates. Many more shades are achievable.

Figure 17:
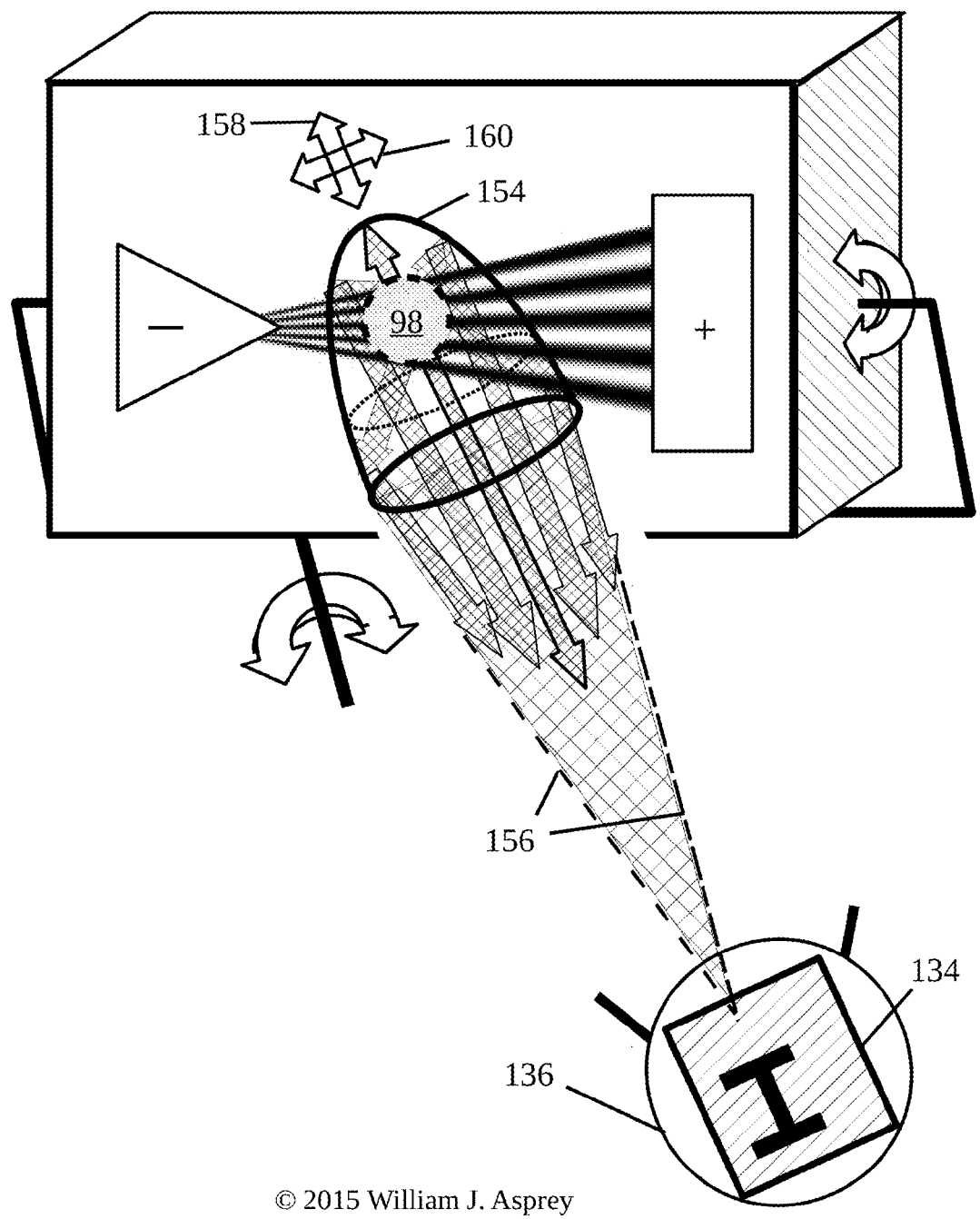
FIG. 17 is a diagrammatic view of a Trichel pulse generator having parabolic directionality.

Parabolic directionality as shown in FIG. 17 may be achieved by placing glow region 98, or one or more components thereof, of a TPG emission 98 at or near a focus of a parabolic reflector 154. The nearly radial emissions 98 do not resonate as repetitiously as previously noted spheres, but emission 98 from at or near the focal point achieves single pass random lasing that provides a spherically expanding pulse for parabolic modulation to parallel or nearly parallel rays 156 for directed propagation for visualization. A single pixel, or portion thereof, is created, and shown reintegrating and directed by horizontal and vertical gimbals to the appropriate focal spot of image 134. Placing glow region 66 at the focus of parabolic reflector 154 produces relatively coherent beams 156 depending on the spatial extent of the particular color within glow region 98. The associated spot size on image 134 of visualizer 136 may be limited to the original glow diameter as random emission disallows coherent focus and wobulation among TPG pixels may provide sharpness improvement. However, optical arrays of focusing mirrors as DMD or the like may be used to further focus, direct, or reduce a size of pixels generated in this manner.

The wide coloration variability of available gap materials for achieving various useful quantum emission ratio mixtures affords billions of colored emission profiles integrating to visualizer 136, with little to no emission glow energy spread outside rays 156 that otherwise would create interference or a reduction of contrast. These directional multi-color light pathways 156 allow focus only at a plane of visualizer 136 when applied as one or more arrays similar to that shown in FIG. 16. Where it is desired to direct beam 156, parabolic mirror 154 may be translatable axially as axial drive 158 for fine focus controls or spot size dithering shown illustratively, either for wobulation. For orthogonal color selection, a lateral mirror drive 160 may be used to sample different colored regions of the glow region. Such drives may be miniaturized as piezoelectric drive elements or other types of miniature drives providing color variant wobulation.

Figure 18:
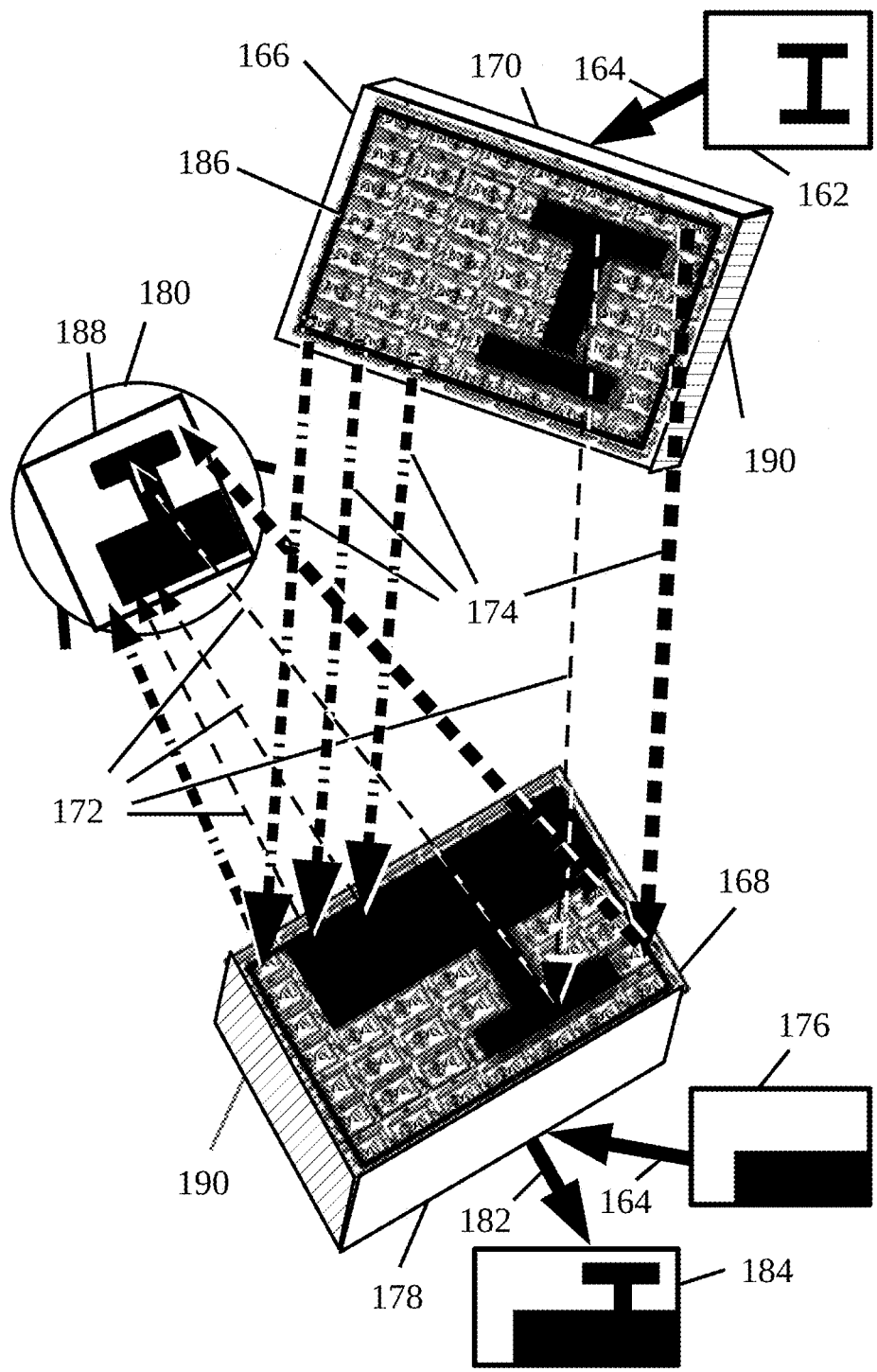
FIG. 18 is a diagrammatic view of how array computing may be implemented using Trichel pulses.

TPG array computation is disclosed in FIG. 18 as data images 162 and 176 provided to input 164 as differently patterned binary arrays of TPG electrode potential pixels making up respectively arrays 166 and 168. These data are mapped as respective input voltages onto TPG arrays 166 and 168 via parallel input TPG switched current divider and synchronous RLC sampler and A/D conversion device 170. Shown here as the black capital letter 'I' of image 162, which is input as Trichel pulse generators that are switched "off", or no emissions, as indicated by finely dashed lines describing directed or aimed rays 172. All other array pixels are mapped as "on", and outlining the black 'I' portion with directed emissions 174, indicated with heavy broken lines, which trigger further directed emissions from the second TPG array 168 programmed with different data image 176.

Note some of rays 174 directed from array 166 encounter unactivated "off" TPG pixels of the black rectangle image 176 potential voltage patterning and so fail to emit corresponding rays 172 or provide TPG currents from array 168 from those pixels. Image 176 opens array voltage controlling switches and current dividing and sampling A/D converting array controller device 178 supplying array 168 pixels specific related voltages to modulate TPG generation to pass photons to visualizer 180 as image 188 and provide in parallel digital electronic output 182 as patterned image 184 equal to the binary 'OR' of correlated or combined images 162 and 176. The lack of emissions from dark regions of image 186 failing to trigger corresponding pixels of array 168 result in provision of bitwise logical pixel bitwise math across extensible TPG arrays 166 and 168, with photonic electronic interconversion and propagation of image 162 as rays 174, and sum with image 176 providing directed emissions of image 188 from array 168 and also digitally produce A/D image 184 as output 182 for recording or other uses.

Triggering of array 168 image 176 binary patterned voltages is caused by the incoming image 186 shown on the surface of and propagating from array 166 triggering the correlated binary 'OR' output of the similar but differently patterned TPG array 168. This yields correlation of the two arrays as photonic TPG glow output of the correlation pattern for each pixel of images 162 and 176 as logical 'OR' results pixel to pixel as mapped. Also, electronic encoding by monitoring TPG currents via parallel input Trichel pulse switched current divider and synchronous RLC sampler and A/D conversion array controller 178 outputs correlation pattern 188 as digitized binary pixel current pulses as a direct result of the triggering pattern of image 186 correlating or combining with the input image 176 on array 168. Input 164 represents the input potentials of the TPG array while data output 110 is the TPG array 172 pixel current representing the same image 188 at visualizer 180, as binary light may be one, and dark may be zero.

'OR computation of the two arrays is accomplished by allowing the correlation pattern of image 162 to emit by ubiquitous array triggering 190, which triggers the emission shown positioned as image 186 with the correlations for transmissions 174, in turn directed in pixel to pixel coordination to selectively trigger array 168. This further correlates with image 176 as image 188 in emission and image 184 recording from TPG array 168. Ubiquitous triggering 190 phases first array 166 data pattern emissions 174 and patterned non-emissions 172 for convolution with aimed image 186 propagation 174 triggering the second image data 176 encoded into array 168 as TPG 'on' voltages for the light background outlining dark regions of image 176. In this manner, a first array 166 is produced, and which directs rays 174 with the first image 162 encoded as beams 'on' or 'off' impinging and mapped pixel to pixel on TPG array 168. This strict geometric relational mapping is not required as pixels anywhere on array 166 can be made to target any pixel on array 168 providing. Convolution of spatially keyed encrypted image 186 beamed to trigger specific cryptic key related pixels of second array 168. Relatedly encoding second image 176 via data input 164 as potentials arrayed on array 168 by keyed spatial encryption providing the TPG electronic output 182, with the triggering convolution outputs beamed as decrypted image 188 from array 168. In addition, output 182 provides image 184 as parallel binary electronic digital data keyed or not.

As all of the elements of arrays 166 and 168 are individually directed, as long as there is propagation of light pixel to pixel from array 166 to array 168, orientation and shape of the arrays is inconsequential as the directed energy from array 166 is sent to appropriate elements of array 168 by careful aiming between each pair of array elements. Aligned and static pixels remain aligned, and may be used for providing alignment functions and further dynamic aiming of such arrays to visualizer 180 if it moves. As such, automated shared key cryptic alignment of array interactions is envisioned in which individual pixels that aim or align to keyed corresponding pixels of arrays provide decryption. Provision is made for user defined automated directionality control with DMD mirrors or individual pixel gimbals adapted for movement in vertical and horizontal directions with array 168 controls. Depending on sensed or known relative geometric optical relationships of arrays 166, 168 and visualizer 180 and adapting their optics, the decrypted array image 188 can be supplied to visualizer 180.

Figure 19:
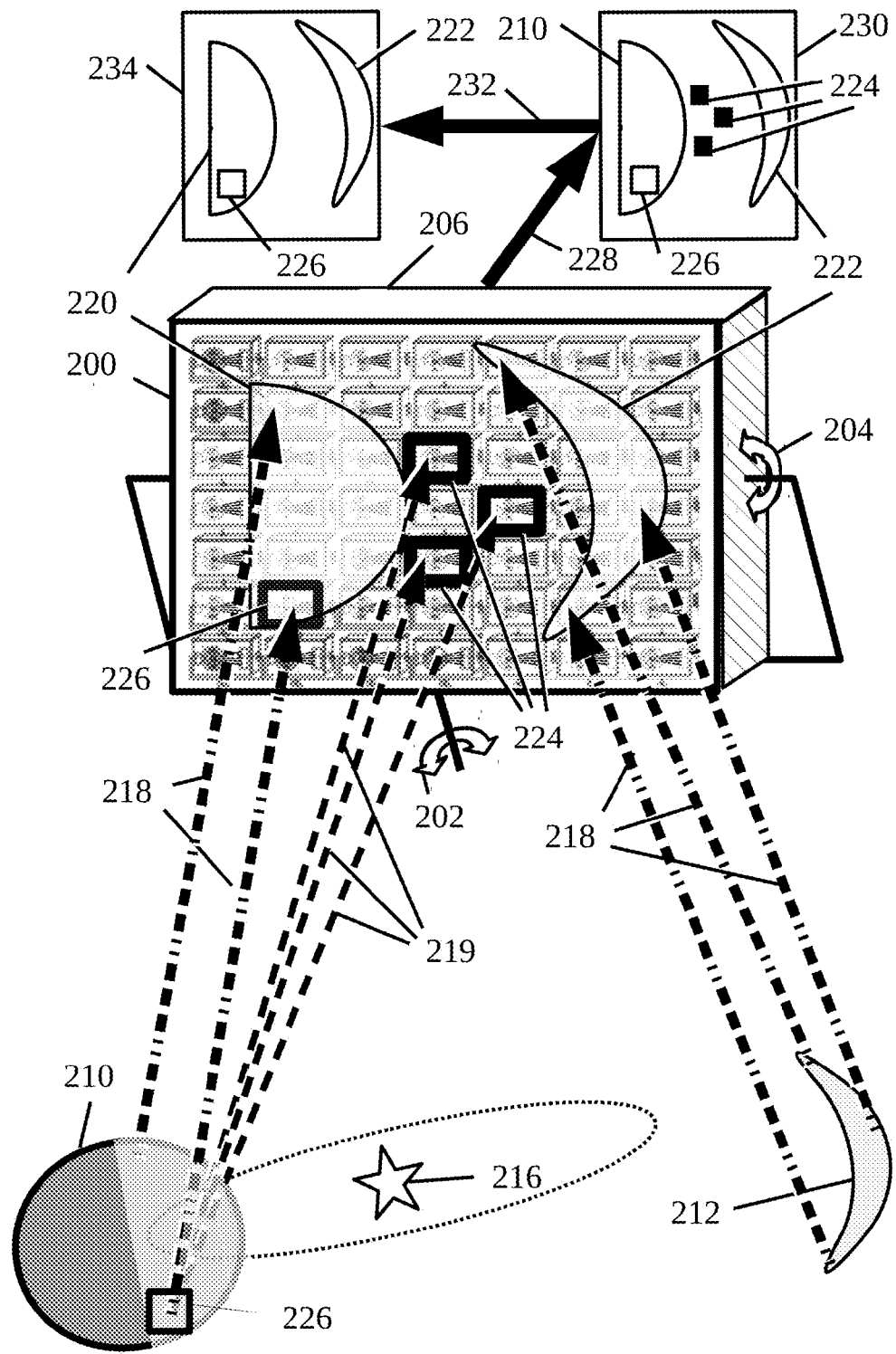
FIG. 19 is a diagrammatic view of apparatus for implementing a multiplexed directional Trichel Pulse array.

FIG. 19 discloses TPG array 200 with controlled gimbal R 202 radial direction control and gimbal A 204 vertical steering drive means illustrated as curved arrows. These gimbals are utilized to generically aim the array 200 as similarly smaller gimbals independently direct individual pixels to be illuminated by specific individual photon emitting targets. TPG array individual pixel voltage waveform controller, current sampler, and A/D converter 206 applies arrayed voltages controlling sensitivity and integration time patterning, or ubiquitously 'on pixel voltages. This allows for imagery photon flux 218, 219 array patterned triggering to optimize target photometry for each pixel. TPG pixels are selectively triggered by illustrated astronomical planetary 210 and lunar crescent 212 scattering of solar 216 emission photons as rays 218 focused to trigger properly sensitized pixels. Each array 200 TPG pixel is individually aimed respectively to focus telescopic rays 218, 219 propagating from these celestial objects as images 220 and 222 as photon flux densities to the focal plane of triggering for array 200 pixels individually. Wobulation induced by atmospheric or other propagation distortion can be detected and deconvolved, or subtracted, providing more accurate photometric renderings.

Telescopic mapping of celestial bodies 210 or 212 or desired remote viewing such as fluorescent confocal microscopy embodiments in such a manner delivers at least MHz photometric frame rate imagery 230. Integrating or averaging image 230 pixel 226 redundant data pixels 224 via post-processing 232 of array digital image 230 output 228. This provides greater accuracy characterizing shared pixel 226 intensity averaging multiple oversampled TPG pixels 224 photometric measurements of pixel 226, even with differing integration times, for improving photometric quality in post processing 232. GPS geolocating of the corners of array 200 provide orientation information for dynamically aiming pixels and accurate GPS time signals provide correlation of aiming and intensity signals with external triggering phased photon events. This places pixel observations image 230 in absolute universal time, corrected by TOF (Time Of Flight) subtraction if the propagation distance is known.

Directing any or all array 200 TPG pixels aiming toward scattered or emitting light from any part or parts of objects 210 or 212 sampled by directionally acquired rays 218 to trigger independent pixels of array 200 from any points of array 200. This may be done with an aiming direction key encryption as disclosed above and the images are produced by deconvolution of the keys.

Pixels 224 in TPG array 200 output image 230 originating in separately commonly targeted gimbaled pixels 224 of array 200 at the surface shown as black squares where points of the arrows tipping rays 219 are targeted to measure also the photometric flux from the same lower extremity of the starlit 216 half of celestial planetary body 210 provided by directing telescopically triggered gimbaled elements of the left part of the array 200 at correspondingly located regions such as common shared pixel 226 of object 210 with similar or different integration times and combined during post-processing 232 as more accurate image 234 pixel 226 rendering.

The multiplexed pixel 226 evaluation providing greater photometric accuracy in post-processing 232 by merging into image 234 redundant pixels 224 as darker, longer integrated pixel values normalized to improve photometric accuracy of post-processed 232 providing more reliable time and intensity data describing pixel 226 in image 234 rendering. This provides post-processed improvement from image 230 incorporating further ray 219 data for statistical improvement of signal to noise and accuracy of source object 210 color and amplitude evaluation associated with pixel 226. Line colors associated with water would demand great scrutiny as the triple ordered redundancy shown here if they appeared within pixel 226 and object 210 were Mars.

Major advantages in single pixel telescopic or microscopic observations correlated over arrays are manifold including inherent pixel entrance pupil confocal filtering effects, arbitrary selectable oversampling, as well as resolution gains from spatially distributed acquisition, especially with multiple widely distributed arrays 200. The 10% quantum efficient (QE) photometry and ns (nanosecond or better) time resolution makes very dim or fast varying dynamic photonic emissions visible at hundreds of MHz to one or many commonly fixated TPG single pixels.

Figure 20:
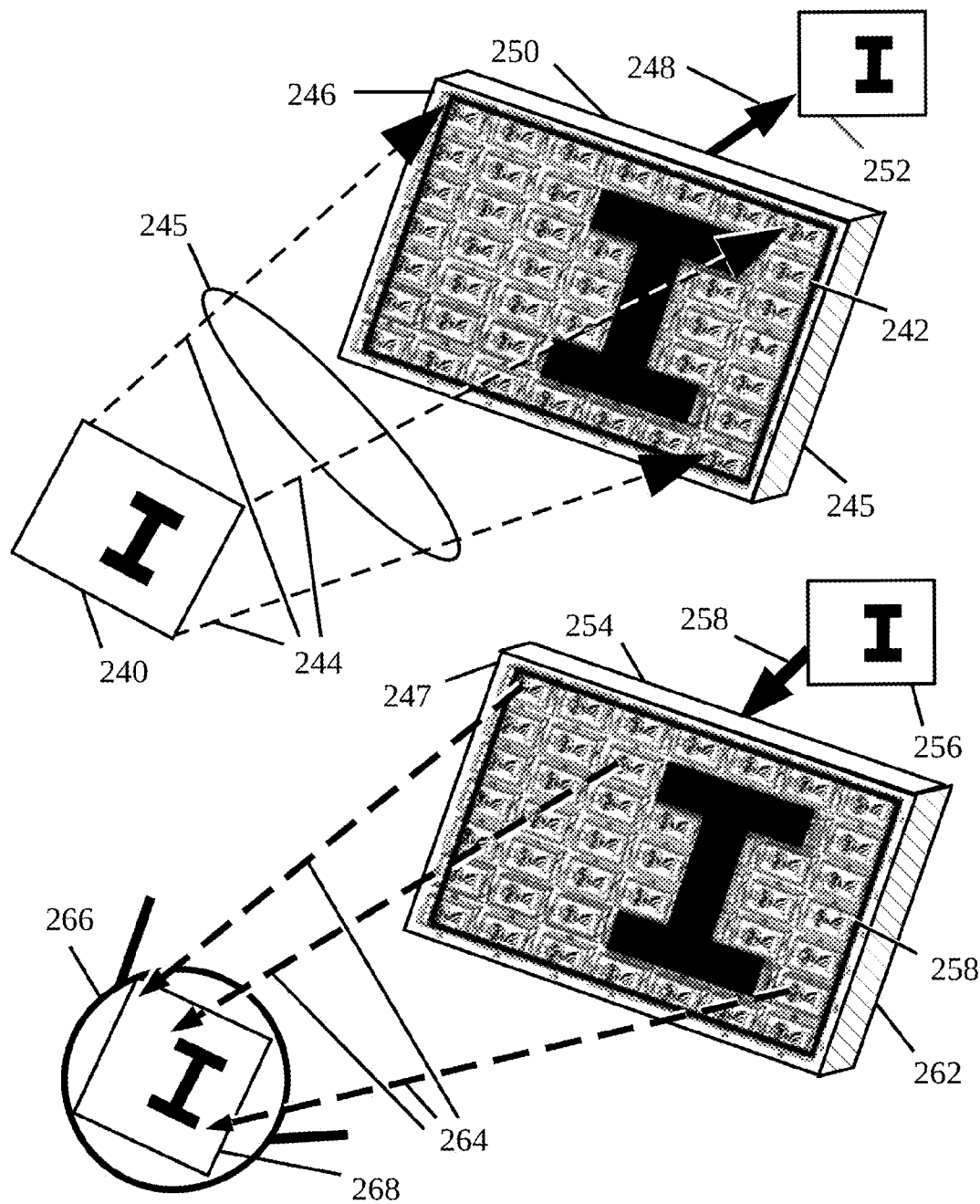
FIG. 20 is a diagrammatic view of Trichel pulse array reading interlaced with emissions writing.

FIG. 20 discloses alternate embodiments of object 240 image 242 input to array 246 via rays 244 focus controlling optics 245 for triggering array 246. Photometric array reading as a camera with the upper TPG array 246 outputting 248 from voltage control and sampling digitizer 250 respectively triggered image 252. Array 246 also glows with image 242 which can be made optimized, invisible, or directed as illustrated with array 247.

Below in FIG. 20, TPG array 247 image 256 is input 258 with array patterned switched pixel power supplied by processor 254 applying TPG voltage pattern of image 256 during the illustrated TPG ubiquitously triggering means provided by whole array trigger 262. The photoemissive duty cycle provides directed propagating rays 264 painting image 268 for visualizer 266. TPG arrays 246, 247 can be duty cycle combined operationally integrally as a single TPG array 246 or 247 operated in either of two differing time or direction duty cycle modes. Directed laser beams 264 propagate pixel laser beams providing images 268 and then immediately after absorb rays 244 triggering image 252 acquiring information in alternating acquisition and emission duty cycles and not necessarily the same images. With this embodiment we may acquire images of object 240 directionally, and then interlace emissions of same or different image 256 in differing laser beam directions, allowing one to see around corners, for example, or image possibly invisible rays 244 as triggering TPG conversion to visible rays 264 as for infrared night vision, or simply to look into the TPG mirror and see yourself as others see you, without inversion, and allowing perfect camouflage as viewing the scene behind you emitted to me from TPG array photonic armoring, you are invisible. This last embodiment is provided by wrapping the user in TPG photometric shielding which automatically takes a pixel picture ubiquitously and then emits this photometric color specifically photometrically from the directly opposite armor pixel as that opposing side pixels emits co-linearly the identical photon color radially. The effect is a viewer of a shielded object, which could be persons or optometric surveillance, sees the same color and intensity distributions as the background emanating from in front of the shielded object, providing invisibility.

Photonic rays 244 cyclically trigger the TPG array 246 as reading externally supplied image 242 conditioned from optics 245 for optimal triggering characteristic. Photonic data triggering with rays 244 triggering TPG pixels provides digitized 250 current signals patterned as image 252 at MHz frame rates or more. Object 240 as patterned light rays 244 acquired by array 246 TPG pixel triggering points as shown as image 252 electronic output 248 in a first duty cycle as an electronic TPG array fast, photometric camera.

Array 247 input Trichel Pulse switched current divider and synchronous RLC sampler and A/D conversion array 250 providing digital output 248 as multiplexed or parallel output image 252 of those points triggered or not by image 240 photons similarly to digital cameras and generic optical sensor chips but with array emission reporting ability. Your television is watching you, but you are invisible in this embodiment.

Interlaced with this first duty cycle above and displayed below in FIG. 20 is image 256, which may be recently acquired image 252, as voltage patterns of TPG array 247 potential voltages from the switched current divider, directional control, and synchronous RLC sampler and A/D conversion processor 254 as patterned binary TPG 'on' potentials on array 247. Those array 247 pixels programmed 'off' from image 256 shown as a dark 'I' object and the associated brightly lit matching pattern surrounding the dark 'I' are programmed to be 'on'. These brightly lit patterns are directed via laser beams 264 shown and others. These correlate or combine properly only at the visualizer 266 image 268 array focal plane as shown. Ubiquitous triggering 262 applications of light, energetic materials, potential spikes, thermal or mechanical shock, or other triggering energy pulses capable of inducing a characteristic Trichel pulse, or other substantially colored spherical emitting energetic gradient induced pulsed stimulated emissions.

Phased triggering by ubiquitous trigger 262 provides image 258 emission in second or other duty cycle Trichel Pulse beams 264. The input image 256 pattern is replicated as pixel direction controlling gimbaled drive means and pixel RGB intensity controlling means provided by the switched current divider, directional control, and synchronous RLC sampler and A/D conversion processor 254 of TPG array 247 pixels matching image 256. Directed emission rays 264 provide image 268 to visualizer 266 with second duty cycle ubiquitous trigger 262 which successfully energized TPG array 247 points outlining the capital 'I' providing laser emission. Propagation of the outline in this case as white light during this emission second duty cycle, or any visible color desired and programmed into processor 254.

Single TPG array 246 is independently directionally triggered by image 242 photon stream rays 244 patterns may in turn alternatively directionally emit image 256 in very fast similarity with image 252 acquisition. Key encrypted scrambling in any independent pixel to pixel directions for spatial encryption and true data obfuscations. Knowledge of the time evolution directional encryption key allows deconvolution of image 256 for visualizer 266 only with correlation in space and time and additionally with the time variant keys providing very secure communication between arrays 246, 247 appearing as scrambled colors without keying.

In simpler terms, each pixel of image 258 to be directed as image 268 is directed by encrypted pixel to pixel mapping with directional encoding producing image 268 in the manner shown but with encrypted pixels providing rays 264 directionally encoded to form image 268 at the location of visualizer 266. In this embodiment, the only space with correct image 268 formation is that occupied by visualizer 266. Closer to or further from array 247 the cryptic arrangements of the beams 264 creates chaotic visualizations 266, certainly not image 268. In other words, a spatially directionally encoded encrypted pixel emission from the bottom of image 258 directed for example to a pixel at the top of image 268 looks like somewhere in between on obscuration screens placed between correlated image 268 and TPG array 247. The screen placed on the surface of array 172 produces the scrambled encrypted input image 256 without propagation to decipher the image 268 properly.

Figure 21:
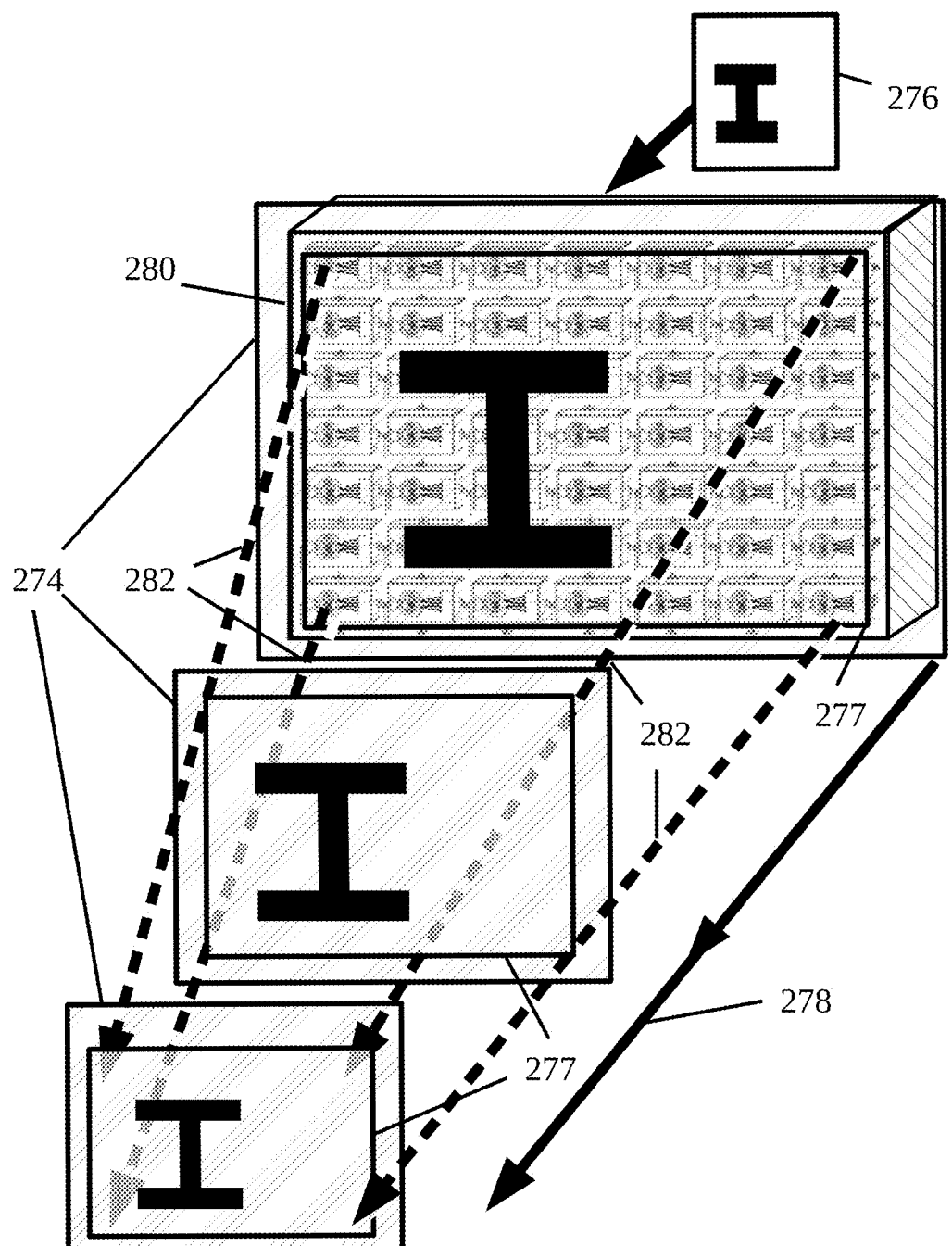
FIG. 21 is a diagrammatic view of apparatus for back projecting images developed using Trichel pulses onto a screen.

In addition, referring to FIG. 21, placing translucent or phosphorescent screens 274 singly one location at a time, over the laser emission beams 264 makes the image 258 available to anyone watching the homogeneously emitted laser speckle, scattering, micromirror redirection, or phosporescence respectively. Directing rays 264 normally from array 247 provides the image 258 scattering from said phosphorescent screen at the same size at any distance from the array 247.

FIG. 21 also illustrates discloses variable diffusive or fluorescent (phosphorescent) panels 274 provided singly with different distances 278 from TPG array 280 providing divergent or convergent (illustrated) laser beam rays 282 emissions intersecting at contracted respectively planar emission image 277 moving out along distance 278. Depending on the amount of divergence or convergence in rays 282 the panel 274 intersects, the image 277 transmitted linearly from each array 280 pixel retains relative positioning and panels 274 reproduces image 277 reliably sized accurate aspect ratio as desired as a back projection TPGz BACK 2D TV embodiment.

FIG. 21 provides image 270 very much miniaturized with constant aspect ratio image 277 to a viewer in front depending on the relative angles of TPG array 280 rays 282 shown here decreasing size with concentrating rays 282. A scattering or fluorescent screen 274 moved in front of a viewer will scatter the same aspect ratio image 277 in transition along rays 282, enlarging and visible on the scattering screen as moving toward array 280. The aspect ratio control is provided by varying the angle off parallel of relative rays 282 emitted to project smaller or larger aspect ratio images 256 onto scattering or fluorescing screens at various distances 278 and relative angles from array 280. The array 280 with diverging rays 282 can project the image 277 upon walls, screens, or other scattering objects providing very large size amplification for group large viewing. In addition, a viewer with all unencrypted rays 282 entering an eye distributed across the iris will be able to see the entire image 277 sized as array 280. Moving further from array 280 will make the apparent image shrink eventually to a white spot and with further movement away will perceive the inverted image 277 as the rays 282 cross and stimulate inverted regions of the fovea.

Multiple receiver viewers or scattering screens are provided image 277 or similar by writing the images to different angles and azimuths relative to shown rays 282 in interlaced modes correlating multiplexed directional gimbaled controls. As each viewer or array 280 is moved a new relationship between each pixel location and viewer eyes must be known and directed by array 280 as image 277 or other emission duty cycle for each viewer image 277 or other input image 276 from coherently alternately interlaced differently aimed transmitted laser beams 282 and so obtained independently at each viewer location with or without phased, color, or directional dithering or keyed pixel encryptions. Different images can be sent to different viewers with differing encryptions in this interlaced fashion.

FIG. 22 discloses a 3D visualizing 300 embodiment for multiple layered invisible, shown flat arrays 302 of TPG pixels each presenting the depth and intensity of 3D image 304 rendering for each layer of arrays 302 reproducing a visible 3D image 306 for visualizer 300 from differing depths shown within the transparent six array 302 stack 308 illustrated perspectively and viewed 300 through the various layered transparent arrays reproducing for visualizer 300 the actual or enhanced depth parallax effects within the original 3D scene 202.

Gimbaled laser directional steering of rays 310 and 312 to visualizer 300 is not required for general viewing at a single fixed correct optical position for visualizer 300 eyes at which the imagery coalesces for accurate 3D rendering. Dithering, undisturbed radial TPG emissions, or more or less diverging rays 310, 312 enlarges the region in front for visualizers such as viewer 300 much like homogenous LCD or Plasma TV pixel glow which appears to all viewers of the device. This comes with a power use price in serving more users from the same device. Those near the single fixed correct optical position for visualizer 300 viewing the diffused or dithered glow of the layered pixels of arrays 302 see the exact same imagery with slightly differing parallax effects just as multiple viewers of real scenery experience differing parallax effects. At least four individuals can watch a 1 meter cubic 3D TV with reasonably good depth rendering, but there is the sweet spot for absolutely correct 3D visualization 300 rendering best quality image 306.

The lake 320 and dock 322 only occupy the nearer depth rendering TPG array 302 layers closest to visualizer 300 emitting those photons which are detected as coming from that depth at that pixel location with parallax angle 313. Greatest parallax angle 313 available from the dock 322 is steeply angled from left eye 314 and right eye 316 of stereoscopic visualizer 300 provides the appearance of maximum closeness.

The mountains 324 behind lake 320 and dock 322 is shown depth rendered with intermediate parallax half way down the array 302 stack 308 and the sun 326 provides minimum far field parallax angle 311 and so retains deepest relative TPG array 302 layer positioning as backdrop to closer field imagery. The 3D rendering embodiment here provides maximal depth resolution discrimination to viewer 300 human perception with controlling ranges of parallax angles 311, 313 controlling in turn divergence for maximizing or optimizing detailed depth perception resolution by parallax.

Normal humans lose stereoscopic abilities at distances more than a few hundred meters and utilize alternative depth cues to integrate with parallax for more accurate far field depth recognition and appreciation. FIG. 22 illustrates this other advantage of this structural 3D arrangement in visualizer 300 head motion side to side causing relatively larger motion parallax angle 318 for comparison with normal stereoscopic vision. Motion parallax is provided wherein the visualizer 146 moves reciprocally providing scaled variation in mentally integrated depth resolution improvements in the apparent angle 318 which cue visualizer 300 providing improved depth perception for mobile stereoscopic visualizer 300.

As scaled renderings of the feature distances in six layers of depth resolution the furthest feature sun 326 in reality and at scale herein attains scaled relative motion binocularly for both eyes 314, 316 when compared to closer features such as the dock 322 which is shown fading into the second array 302 distance and the very distant sun 326 sinks orange into the valley of the less distant mountains 324 rising beyond the lake 320 distributed into the distance across the closest three TPG arrays 170.

In this example the depth and feature distance provides near field to assumed 1 Km distant far lake 320 shore and mountains 324 fringes rising as over half of the depth rendering TPG array 302 stack 308. The distant features between the lake 320 and infinity at the sun 326 provide depths from 1 Km to infinity as the final few layers of the shown TPG array stack 308 providing far better relational integration and depth appreciation for visualizer 300 than viewing the original scenery yielding image 306 as variable bioptic enhancement for severely vision disabled visualizer 300 humans.

The dock 322 with lake 320 beach and shore is rendered at near field first array 302 extending further in the distance across the two closest arrays 302 extending the dock 322 out onto the lake 320 providing maximum resolved parallax angled 313 stereoscopic vision at relatively close distances occupying intermediate to near field corresponding arrays 302 depth rendering image 304 as TPG array 302 emissions at the corresponding TPG depth arrays 302 area pixel coordinates emitting RGBz providing color (RGB) and depth z rendering.

In this embodiment, ubiquitous triggering 328 is required as the imagery is intended for viewing rather than processing of data and only positive 'on' states from image 304 input need to be activated to feed viewer 300 3D emission desires.

As microscopic arrays 302 of TPG elements, the deeper arrays 302 of stack 308 projecting viewer 300 data emissions rendering rays 310 through overlaying stacked arrays 302 by providing transparent, microscopic, or edge on TPG materials such as electrodes, electronic pathways, and reflectors if parametric amplification is desired. Minimizing obscuring materials in building the arrays 302 minimizes distortion from propagating deeper arrays 302 through shallower arrays 302 on the way to viewer 300.

User preference controls provide for brightness, focus, or laser direction control desired for alternate viewers (FIG. 23) in addition to visualizer 300 as co-temporal and secure imagery data energy efficient 3D locally limited viewing for multi-color Tf (teraflop) per second bandwidth multi-directional depth communication and remote linking.

An embodiment with perhaps 1000 depth renderings at 3D 0.1 mm TPG pixels yield for 1000 depth 1000 pixel square arrays 170: 1000 pixels×100 um each=100 mm=10 cm and for volume, cubic with: 1000 cubed=one billion Trichel Pulse generators in 3D 1000 cubic centimeter array with 10 centimeter linear dimensions.

While useful for personal viewing, scaling to television size or larger is inclusive of directional colored informational array 302 stacks 308 with distance data together defined as 3D depth colored encoding referred to here as RGBz encoding pixels across x,y areal arrays 302 of primary colors RGB (Red, Green, Blue) with z depth encoding to deeper stack 308 arrays 302. Depth wobulation between arrays 302 may improve the depth resolving experience.

In this manner, a complete pixel surface viewable by a single observer will encompass just the collapsed stack 308 area of a single array 302 pixel density for viewing from a defined point in front. When random emitters, all directions of viewers 300 will see the skeletal colored framework of the 3D image 304 as it emits while only the correct viewpoint will yield accurate 3D rendering to visualizer 300 matching or improving with image 306 depth rendering.

Since the data requirement then is only the top surface pixel count (a few more for fading distance) in this example 1000 Trichel Pulse generators (TPG) across 10 centimeters (240 DPI B/W or 80 DPI color) assuming 1 m linear dimensional emission volume 1 cubic meter television requires maximally:

TPG television linear pixel count==1 m×10 TPG/cm each color==1000 TPG per 1 m television 1D TPG row with similarly square aspect 1000 columns yields the complete pixel count and frame input loss less format data density requirement for live action 1080p 3D TV:

RGB frame==1.08K×1.92K×4 RGBz==8.29 MB per RGBz frame minimally with pixel fading along depths. This embodiment includes limiting frame depths to stacks 308 of about 1080 array 302 over the entire meter (<1 mm TPG resolved) or less z depth. Representative of human resolution of depth of common movie sceneries which provide for a 3D depth aspect of 100 TPG array 302 layers to provide 1080pz formatting (1080p+Z depth) surface pixelation data rates for RGB video at 60 Hz requiring easily obtainable data rates of around 100 MB per second with no compression for singular viewers.

Real normal human visualizers 300 are limited in depth resolving powers to about 1 cm over 1-3 meters which makes redundant or 'smoothed' many of the 1080 depths the RGBz data format requires. In fact 100 depths will render sufficient depth resolution to satisfy all available visible demand for depth information for visualizers 300 within 1 m of a 3D TV embodiment surface providing 1 cm separations for arrays 302 in stack 308 providing variable 3D enhancement vision aid for visualizer 300 humans.

Providing in FIG. 23 visualizers 330 and 332 right eyes 334 and left eyes 336 particular ocular systems optical characteristics of each eye as corrections known by the stack 340 and through input 342 input voltage array controlled current source manifold 344 conditioning each beam for each eye tailoring to each visualizers ocular need or desire. Highly corrective laser TPG arrays 346 emissions provide viewing with no prescriptive lens requirements. The ocular system conditioning 344 includes corrections for viewers 330, 332 vision system requirements and motion tracking providing predictive deconvolution for position and visual plane of visualizers 330, 332 providing location by telemetering via blue tooth or IR, video abstraction from monitoring, monitoring reflected TPG emissions from arrays 346, or manually fixed settings.

Stretching the scenery to panoramic provides for more viewers 330, 332 with less distorted views of the emission images as surfaces originally viewed as color and depth pixel profiles so rendered in emissions from pre-processing conditioning 344 distorted input 342 to the TPG arrays 346 to serve more users 330, 332.

High data throughput rates above GHz in multi-color fiber phased bidirectional transmissions and decoders is provided with TPG arrays communicating herein as new invention.

Oblique views illustrated in FIG. 23 appear normalized with resonant shutters or filters worn by two or more viewers chopping laser emissions as specifically co-phased directed chopped duty cycle emission images from the TPG array elements providing different 3D image interlaced views available only to chopper phase correlated viewing by multiple viewers interspersed and directionally, radially divergent as well. Current 3D display technologies utilize such alternating eye view chopping for phased stereoscopic presentation of flat viewpoints to separate eyes. This embodiment directs differing programming in real scaled 3DTV to multiple viewers at the same, but interlaced times requiring both eyes to shutter and open in phase to see the particular 3D view so phased.

This multiplexed interlaced chopped directionality allows multiple independent viewers of the same or different shows programmed for each viewer's prescriptions, location, angle, depth range desired, and image brightness depending on location respective to the TPG arrays 346 z depth television stack 340 (hereafter designated TPGz TV) to provide accurate depth rendering to viewers at variable directions or separations of the same or entirely different shows at the same time sharing audio with blue tooth locations of visualizers 330, 332. Providing directional functionality by driving gimbaled pixels of arrays 346 or pixels fixed as permanent viewing laser directing to locations adjustable by directing gimbaled arrays 346 pixels as FIG. 23 discloses.

Un-chopped viewing of the TPGz television volume with one or many programs emitting variably to several chopped duty cycle viewers appears as a random colored 3D emission (think of changing flat 3D holograms) with occasional recognizable apparitions of the various shows visible in spatial TPGz regions unoccupied by other unrelated emission renderings of other viewer 3D imagery overlapping over many frames.

Proper rendering is provided only in the correct correlated location with the correct chopper shuttering co-phasing exposure with directed energy information for the correctly visualized 330, 332 correlated 3D imagery direction and imagery pixelation positioning. Improper visualizers 330, 332 positioning results, even with proper chopper phasing, in pixelation spillover overrunning the imagery beyond cognition, although watching multiple interlaced programming could be a learned ability for increasing data and information delivery to a viewer. The extreme nsec transience of the glow of TPG emission events coupled with laser amplification allows separation of many interlaced imagery views.

FIG. 23 also describes layered TPG arrays 346 stacked 340 with individually controlled pixel directional gimbaled controls 120, 122 from FIG. 15 and directional control of individual TPG emissions (FIG. 14) to provide one or more 3D images to two or more viewers 330, 332 at the same time. As each viewers have different viewpoints of a TPGz TV there is no single correlated 3D image possible to provide them both singularly simultaneous accurate depth rendering as they cannot share the same viewpoint and only one will provide accurate rendering without directing the energy specifically into the left and right respectively eyes 336 and 334 specifically as well for each of viewers 330, 332.

Duty cycled interlaced directed laser beam closer rays 350 and further rays 360 forming respectively different image 354 for visualizer 332 and image 356 for visualizer 330 from different perspectives for two or more viewers as interlaced pulses in phase with each of viewers 330, 332 locations. Image construction within the TPGz TV volume is directed at particular viewers correlating correct viewpoint with correct possibly differing 3D images 354, 356 directed anywhere in sight of the TPGz TV volume with known eye 334, 336 locations, direction of viewing, phasing, laser directing, and programming interest providing viewer 3D TPGz TV satisfaction.

This requires either prior knowledge of visualizers 330, 332 each eye locations and directions or continuous update by tracking viewers for transmitting laser painted 3D appearance specifically to each viewer to fit each viewpoint providing the image laser paintings 354, 356. The different parallax angles 352, 362 defined respectively by visible rays 350 and 360 must be directed from the stack 340 of TPGz TV arrays 346 and are shown clearly different for each of visualizers 330, 332 for every ray 350 from close layers and rays 360 from far layers respectively of TPGz TV arrays 346.

Interlacing perspective images 354, 356 with gimbaled redirection of array 346 pixels provides different directions and viewing locations for each viewer and may be the same imagery corrected for depth rendering for each and each viewer can watch different programming with different images entirely, one static or not and the other the imagery moves like a movie as RGBz TPG TV as Red Green Blue z depth TPG Television.

In simple terms, directed emitting gimbaled TPG array laser beams provide rays 350, 360 writing color-specific images across retinal or other visualizers 330, 332 images respectively. Each retinal image 356, 354 pixel can be done by one TPG emission pixel continuously in raster scan or passed from pixel to pixel with image RGBz requirements transferred to the alternate pixels and can be encrypted as jumbled patterns only visible as images 356, 354 at visualizers 330, 332 as shown.

Alternatively, undirected TPG pulse energy creates homogeneous glow pixels at the correct depth for only the direct viewer while this embodiment provides the advantage of multiplexed views serviced with encrypted actively directed interlaced TPG radiation patterns.

Figure 24:
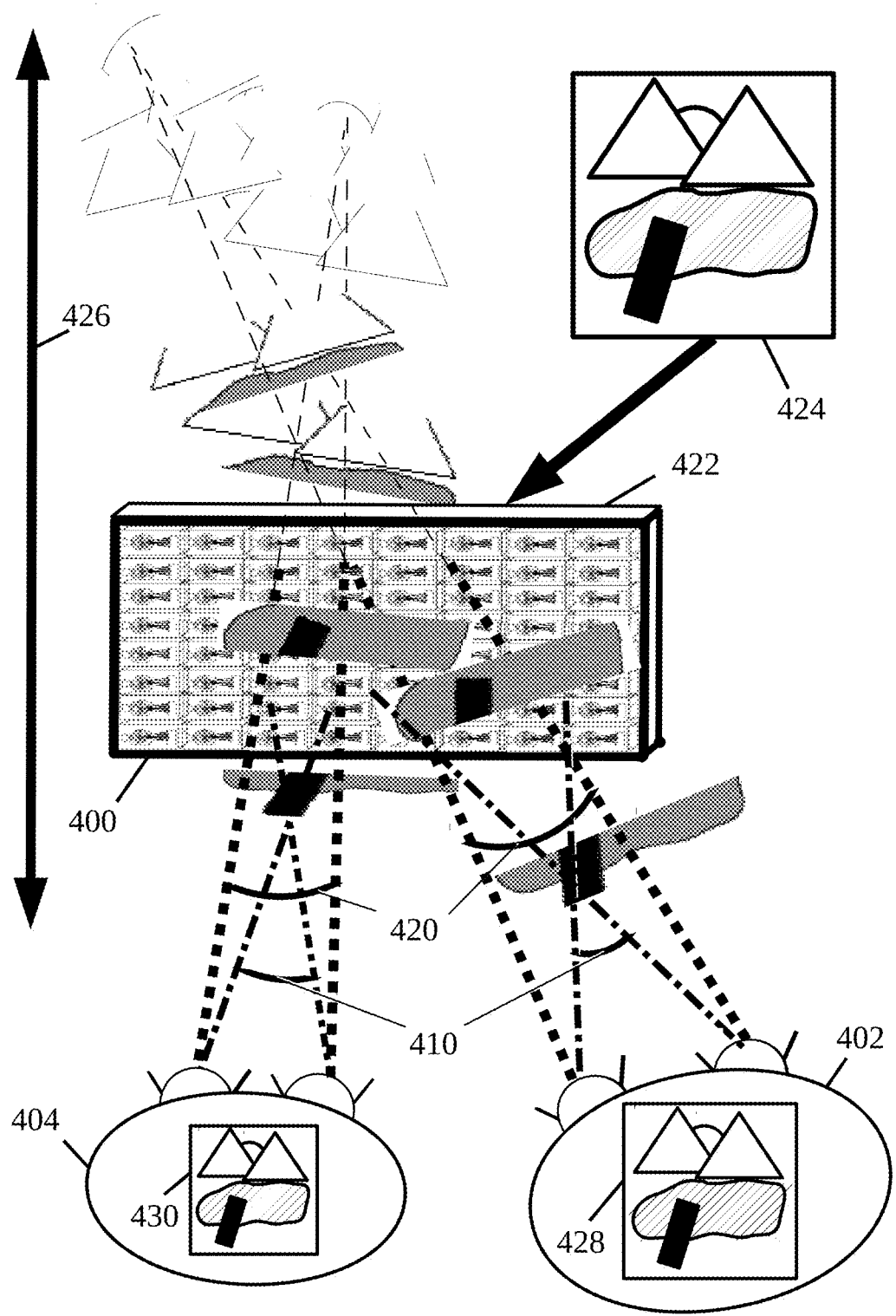
FIG. 24 is a diagrammatic view of an embodiment of flat directed 3D imaging using Trichel pulses.

FIG. 24 describes an 8×8 flat TPG array 400 providing visualizers 402 and 404 stereoscopic angular effects with angular 410 and 420 control of separated RGBz TPGz emission pixels on flat array 400 which is drawn representationally with directed visible laser TPG pixels propagating as broken lines to viewers eyes. Actual smaller mm scale array 400 pixels during separated emission cycles directing alternately to visualizer 402 and then 404 in sequence, repeating above 80 Hz for moving picture representation. The input desired image 424 or any interlaced RGBz or equivalent format imagery applied to array 400 via input voltage array directive controlled current source manifold 422 is decoded from RGBz pixel data with the z coordinate transformed into emission pixel directive algorithmic implementation as distances z related to emitting pixel separations depending on desired depth amplification of users. Along with array 400 planar separations mimicking ranging z image distance 426 for rays forming exemplary parallax angles 410, 420 such that each visualizer 402, 404 each is provided complete separately presented 3D image 424 with each controlling their own z depth distance 426 range algorithmically modulating angles 410, 420 via directive controls 422. Each visualizer perceives the whole 3D scene 424 in a desired depth interval distance 426 as well as choosing the near field distance defined by angles 410. Controlling the angular 410 to 420 range equivalently controls the z depth range of distance 426 to variable ranges of depths for viewers while defining the near field distance whence different angles 410 for each viewer 402 and 404 providing extremes of closeness to viewers defined by angles 410 appearing to emanate from variably close features as shown. The angles 420 define the extreme for each viewer of distance 426 algorithmically delivered from z dependent separated pixels of separable 3D images 428, 430 independently directed respectively interlaced only to viewers 402, 404.

For example, array 400 calculates 422 separations for each pixel z depth pairs providing parallax separated emissions from the plane of array 400 as equidistant pixel emissions centered on correct distant pixel location across array 400 with directed energy mimicking parallax functionality. From the z byte of RGBz four byte encoding the algorithm calculates the emission pixel offset for each z value of the entire array, emitting from planar array 400, shown for simplicity, or any shaped distribution of TPG directed emitters capable of laser painting the same or different images 428, 430 respectively to the visualizers 402, 404.

Each depth value maps functionally as the z depth distance 426 correlated pixel separation equivalent to eye separation for viewers 402, 404 at maximum parallax distance rendering and angle 420 approaches zero so that two eye separation pixels emit parallel beams to the viewers providing maximum distance 426 effect. TPG laser color energy direction into eyes renders parallax and relative motion cues to the visualizers 402, 404. Both viewers are nearly paralleled with parallax angles 420 near to zero emulated by the separations of the pixel emissions directing localized associated energy into the respective eyes of viewers 402, 404 which see different depth distances 426 as shown as the functional relationships with pixel separations programmed for each directive angles 410, 420. Motion parallax is provided by algorithmically computing 422 feedback changes in viewers 402, 404 positions while providing emulation of the motional parallax as different pixels will emit differentially to produce the illusion of motion parallax for viewers 402, 404.

As each visualizer 402, 404 user in FIG. 24 views different angles and z depth distances 426 for every location on array 400. They are receiving entirely different interlaced or parallel (for directed rather than dithered projection) data sets from array 400 directing TPGz FLAT 3D pixels providing separately complete generated interlaced or paralleled differentiable imagery such as image 424 separably and individually zoomed and directionally extended outward from viewers providing the parallax illusion from in front of the TPGz FLAT TV array 400 to well behind to distance 426 as individually desired. Both visualizers 402, 404 view complete 3D renderings but with viewer choice controlling 422 how closely and what direction the image 424 is rendered as well as the depth z 426 renderings.

Since the two visualizers 402, 404 are illustrated watching the imagery 424 at converging directions oblique to z range depth distance 426, their appreciated 3D renderings appear to cross just behind array 400 with little crosstalk visibility or energy from the other rendered viewpoint with concentrated array 400 beams. Dithering or expanding array 400 beams allows larger regions of visibility at the cost of sharpness, again wobulation in 4 dimensions, x, y, z, t may pay when groups view.

In an embodiment the entire 3D imagery 424 is placed between the front of the FLAT TPGz TV array 400 and visualizers 402, 404 such that closer imagery cross between TPGzTV array 171 and visualizers 402, 404 providing maximal depth resolution as shown for viewer 402 choosing more closely angled 410.

Each user of this flat panel FLAT TPGz TV array 400 must have some biometric information provided to the input voltage array directive controlled current source manifold processor 422 for conversion of supplied RGBz or other 3D formatted image 424 into mapping of distance separated pixels algorithmically related to z depth, delivering targeting information for beam trajectories for each separated pixel, controlling the TPGz array 400 RGB intensities, and tracking each of the eyes of visualizers 402, 404 as they translate or rotate relatively to array 400 and algorithmically calculating relative position changes and maintaining aiming separably to both eyes of either or both viewers 402, 404 as they move.

In addition, the figure demonstrates the different magnification, or zoom, applied by processor 422 chosen by visualizers 402, 404. The parallax angle 410 for visualizer 402 is larger and more pronounced providing the appearance of nearer field occupation in front of the screen while far field nearly parallel (angle 420 is near zero) appear to emanate from behind the otherwise dark screen.

The appearance provided by the TPGz FLAT system is 3D rendering user chosen depth range from just in front of visualizers 402, 404 as parallax angle 410 representing closeness to far field ranges 426 angles 420 representing infinity which angle ratios define the depth ranges defined by user visualizers 402, 404 or others loaded into system 422 as desirable 3D viewing characteristics personalized for each independent viewer.

Each user must provide personal optical biometric features such as eye separations or prescriptive corrections for processor 422 by entering data manually or by optical sensing, defaults, or GPS or relative staging of eye location and focus response. Users also provide personal preferences for zoom levels, extremes of depth rendering, and other standard display controls such as images 428, 430 brightness or tint.

A casual observer without data loaded into the TPGz processing 422 directing system would see very little emanation from the TPGz flat panel and nothing of the imagery as the TPG emission energy is columnized and directed only to visualizers 402, 404. Many other people are served at the same time by the same array 400 TPGz FLAT 3DTV with the same or differing programming with personalized zoom as the cross talk is nil.

The processor input TPG voltage array directive controlled current source manifold 422 provides TPG voltage and direction to pixels to provide TPGz laser photon energy matching image 424 patterning including pixel separations for z depth function and calculates and provides specified zoom and depth range of emission direction signals and actuation of gimbaled pixel controls based on correlation of the input image 424 RGBz and direction and range to each eye of visualizers 402, 404 and guests.

The TPGz FLAT 3DTV does not require chopping or alternating viewpoints to provide multiple user visualizers 402, 404 and others 3D programming of each persons choice parameterized as each person sees fit while sharing resources.

Figure 25:
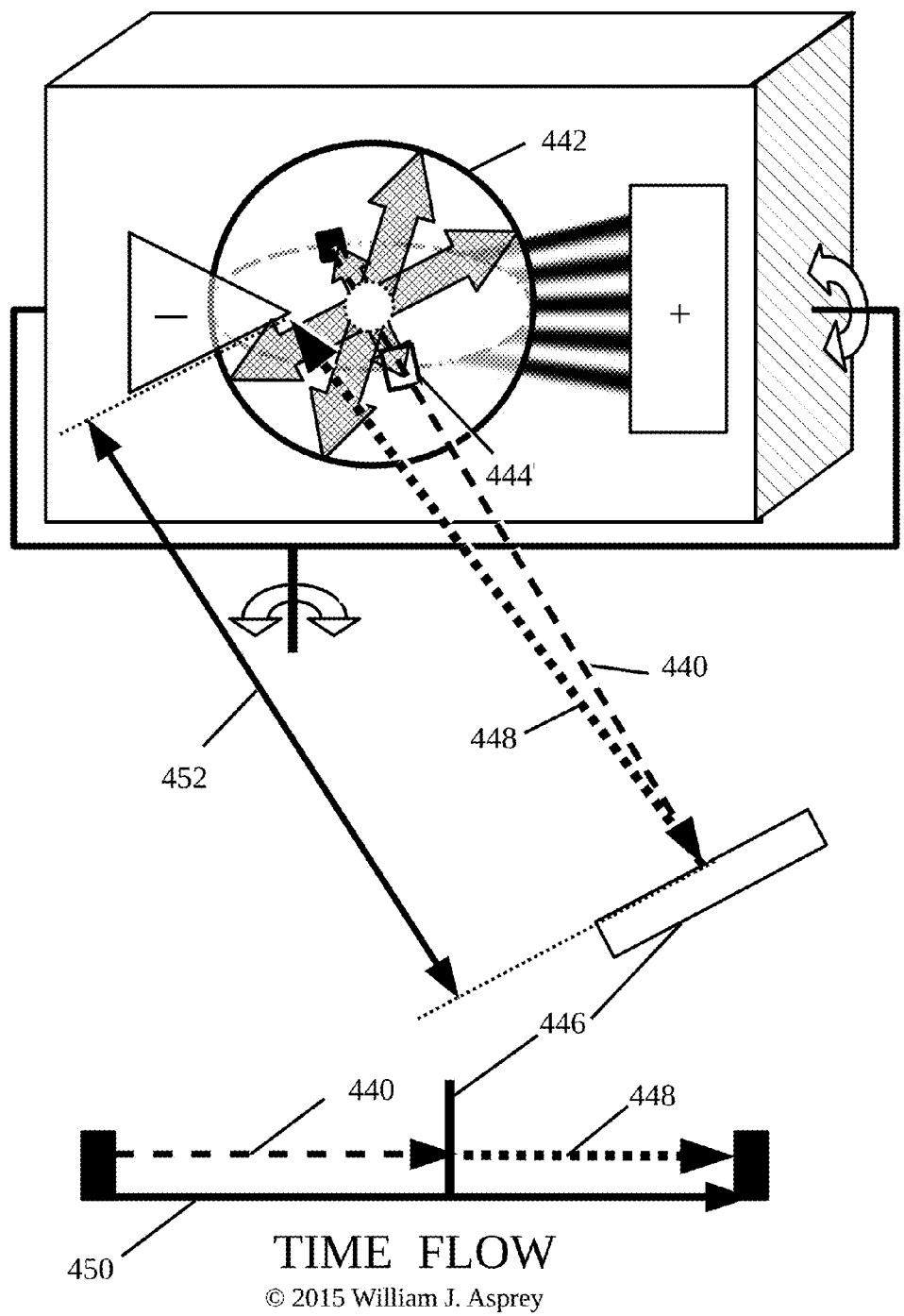
FIG. 25 is a diagrammatic view of directed Trichel pulse generator laser distance measuring apparatus.

FIG. 25 discloses red or other laser beam ray 440 propagating as directed with gimbaled drives from red spherical resonator 442 beam 440 source through slit or optical beam 440 take off aperture 444 to scatter from targeted object 446 providing returned scatter TPG triggering ray 448. Time measurement of this total TOF (time of flight) divided by about 2 provides D=distance 452 obtained by determining the time between TPG producing ray 440 and a TPG current pulse from triggering by ray 448 providing the TPG pulses shown on the TIME FLOW axis shown in FIG. 25.

The sum of the time for propagation from the first emission ray 440 dashed line propagation to the object 446 interrogated for distance summed with the return scattered TPG triggering ray 448 propagation time to trigger the TPG current pulse yielding the total TOF 450 for the photon rays 440 to propagate and then return from object 446. The TOF 450 divided by 2 provides the average one way ray 440 or 448 distance 452=D defined propagation with the speed of light c=$3 \times 10^8$ m/s: D=c×TOF/2 providing measurement of the distance 452 D between the TPG emission rays 440 to the object 446 or from the object 446 back to triggering the TPG via ray 448.

Arrays of TPG allow very fast surface contour mapping as each TPG pixel evaluates the distance to objects 446 normally distant 452 from the TPG array beam rays 440. As each paralleled rays 440 of a TPG array each interrogates the corresponding object 446 pixel providing TOF and calculated normal array of distances defines the contours of object 94 in less than nanoseconds after the rays 440 scattering from object 446 returns rays 448 defining the TOF distance 452 for each array element.

Since the TPG only triggers when scattered ray 448 is acquired by the corresponding TPG point via ray 448 in this embodiment, the series of TPG emissions will phase with the TOF providing continuous integrating power and accuracy for TOF and thereby providing readily obtained computed distance 452 to within 3 cm distance 452 resolution accuracy with integration of 1 second from close to very far away as the lasers preferentially scatter as coherent speckle.

In addition, ⅓ m distance 452 resolution is readily obtained within a ns providing nearly real time distance evaluations continuously updated with ns resolution in time 450 and ⅓ m resolution in space distance 452. More integration provides greater distance 452 accuracy with less accurate time derivative evolution data for quickly changing distances 452 to objects 446. The first time derivatives of distance 452 to object 446 provides velocity and the second the acceleration providing the TPG users, along with tracking via driven gimbals 66 and 67 and vector correlations, a complete remote vector description of object 446 motion and shape shifting nearly in real time.

For target acquisitions fast surface identification and motion description is required for shape recognition and complete vector motion descriptions for two or more locations on object 94 provided with two or more TPG devices is providing complete surface orientation and motion vectors for identification, targeting, and aiming munitions or other data for predictive arrival at the correlating location of object 446.

Figure 26:
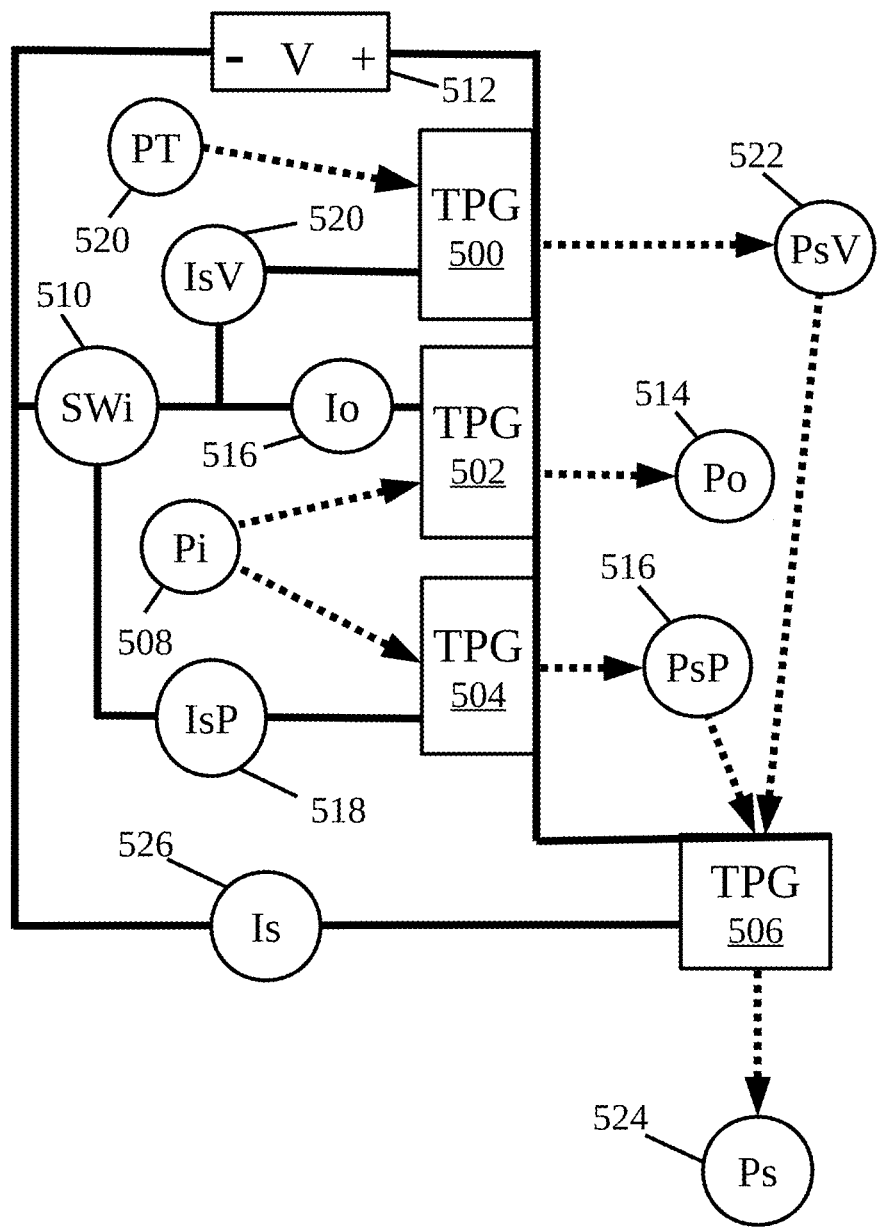
FIG. 26 is a diagrammatic view of a binary half adder using Trichel pulses.

FIG. 26 specifies a half adder binary sum processor which uses 4 TPG devices, 3 as binary AND gates, TPGs 500, 502 and 504, and one as an OR gate, TPG 506. Input photonic pulse Pi 508 binary summed with input switch SWi 510 considered 'on' or bit 'one' when providing voltage to TPGs 500, 502.

The disclosed digital half adder mixed photoelectronic half adder function providing bitwise summation of logical inputs controlling a single pole double-throw (SPDT) power limiting switch SWi 510 providing logical voltage V 512 for processing as input to logical AND TPG 502 with adder input photon pulse Pi 508 logical one (meaning it exists) adding bitwise with input data switched SWi 510 logically with voltage V 512 triggering logical AND TPG 502 emitting binary logical AND resultant half adder logical carry output pulse Po 514 and current Io 516.

The half adder sum is provided by data phased stable voltage V 512 triggering logical OR TPG 506 by partial half adder photon sum data phased photons PsP 516 or current IsP 518 logically OR processed with switched SWi 510 partial sum voltage V 512 interrogating TPG 500 voltage V 512 state from input SPDT switch SWi 510 and providing current IsV 520 and emitted photons PsV 522 due to triggering phased applied triggering pulse PT 520 phase providing complete half adder logical sum output pulse Ps 524 and current Is 526 from photonic inputs both pulses PsV 522 and/or PsP 516 pulse provided to OR gate TPG 506 triggering in either data phase pulse PsP 516 or pulse PsV 522 triggering phased operation.

The half adder referred truth table provided is as follows:

| Inputs: | | | | |
| --- | --- | --- | --- | --- |
| Photons Pi 508 | 0 | 1 | 0 | 1 |
| Switch SWi 510 | 0 | 0 | 1 | 1 |
| Outputs: | | | | |
| Carry Po 514, Io 516 | 0 | 0 | 0 | 1 |
| Sum Ps 524, Is 526 | 0 | 1 | 1 | 0 |

Supplying power as data input via switch SWi 38 controlling voltage V 512 supplying combined logical AND TPGs 500, 502 to a single triggering event per clock cycle equivalent data phase plus triggering phase producing only logical current IsV 520 and pulse PsV 522 or only current Io 516 and pulse Po 514 with every adder cycle.

In this embodiment, controlling switch SWi 38 RLC characteristic provides TPGs 500, 502 potential voltage V 512 temporarily until one of TPGs 500, 502 emits depleting voltage V 512 provided through RLC switch SWi 510 eliminating conditions allowing pulse PT 520 triggering when TPG 502 has provided binary one carry during triggering phase. The partial logical half adder sum outputs current IsV 520 and emission photon pulse PsV 522 are only evident as told in the truth table above when SWi 510 provides voltage 'one' AND no input photons Pi 508 are found, zero, during that adder cycle.

Providing the complete sum bit as the half adder output pulse Ps 524 and current Is 526 from combining in logical disjunction partial sum data phased photons PsP 516 with partial sum triggering pulse PT 520 phased TPG 500 emitting photons PsV 42, either of which triggers logical OR TPG 36 providing half adder sum pulses Ps 524 and current Is 526 as the complete optoelectronic half adder sum.

Binary zero SPDT switch SWi 38 input is defined as providing pulse voltage V 512 to AND TPG 504 throw allowing current IsP 518 to flow while emitting pulse PsP 516 only when input pulse Pi 508 exists during the adder binary clock cycle. Thereby single pole double throw switch SWi 510 is providing no voltage to currents IsV 520 or Io 516 throws during each data pulse Pi 508 plus triggering pulse PT 520 phase time span adder clock cycle while still providing input photons Pi 508 as logical state one triggering TPG 504 AND gate providing half adder photon partial logical sum as pulse PsP 516 and current IsP 518.

Both photonic Ps 524 and electronic current Is 526 outputs of half adder sums are both providing the sum as propagating TPG pulses emitting and electronic TPG currents and pulses Po 514 and current pulse Io 516 as binary half adder carry and combining with further TPG processors provides logical full adder gate systems and new optoelectronic computing systems.

This discloses the original invented triggered TPG laser and directed applications of Trichel Pulses to fulfilling unmet electronic and photonic needs in simpler, less costly forms.

The invention claimed is:

1. A method for producing pulsed laser emissions comprising:
   providing a pair of opposed electrodes, said opposed electrodes having a gap therebetween, said gap configured to receive and contain a gaseous material, said gaseous material selected to emit photons of at least one predetermined wavelength,
   applying a voltage potential between said opposed electrodes, said voltage potential being of a level just below a level to overcome a dielectric constant of said gaseous material so that self quenching Trichel pulses occur in said gaseous material, stimulating said gaseous material to emit said photons of at least one predetermined wavelength,
   orienting one or more reflectors around a region where said Trichel pulses are emitted, and spacing said one or more reflectors from said region where said Trichel pulses are emitted a distance that is a function of said predetermined wavelength so that emitted said photons are returned to said region where said Trichel pulses occur and stimulate emissions of coherent light,
   using said coherent light in a laser application.

2. The method of claim 1 further comprising configuring said one or more reflectors as generally cylindrical or spherical reflectors.

3. The method of claim 1 further comprising selecting said gaseous material to emit said photons of red, green and blue wavelengths, with locations of emissions of said red, green and blue wavelengths being spaced apart within respective said Trichel pulses a distance corresponding to an energy level of an electrical gradient in said gap that stimulates emission of said photons of red, green and blue wavelengths.

4. The method of claim 3 further comprising selectively centering at least one location of emissions of said red, green and blue wavelengths within said one or more reflectors so that at least one of said red, green and blue wavelengths is stimulated to emit said coherent light.

5. The method of claim 1 further comprising triggering said Trichel pulses so that said Trichel pulses are precisely and controllably timed.

6. The method of claim 5 wherein said triggering of said Trichel pulses further comprises using light to trigger said Trichel pulses.

7. The method of claim 6 wherein said using light to trigger said Trichel pulses further comprises mode locking said coherent light by diverting a portion of resonating said coherent light and directing said portion of resonating coherent light onto an electrode of said opposed electrodes.

8. The method of claim 7 wherein said using light to trigger said Trichel pulses further comprises using light obtained from at least a portion of an image to trigger said Trichel pulses.

9. The method of claim 4 further comprising:
   linking beams of said coherent light from two or more sets of said opposed electrodes and respective said one or more reflectors so that a linked said beam of coherent light selectively resonates,
   triggering said Trichel pulses in said two or more sets of opposed electrodes and said respective one or more reflectors so that said Trichel pulses in each of said two or more sets of opposed electrodes and said respective one or more spherical reflectors are precisely and controllably timed,
   In at least one of said pairs of said opposed electrodes and respective said one or more reflectors, controllably selecting a one of said red, green and blue wavelengths to link with a beam from the other of said pairs of opposed electrodes and respective one or more reflectors to emit various mixed phase and color beams from said pairs of said opposed electrodes and respective said one or more reflectors.

10. The method of claim 1 wherein said orienting one or more reflectors around a region where said Trichel pulses are emitted further comprises configuring said one or more reflectors as one or more generally cylindrical or spherical micromirror arrays, for selectively directing emitted said photons of at least one predetermined wavelength.

11. The method of claim 10 further comprising:
selecting said gaseous material to emit said photons of red, green and blue wavelengths, with locations of emissions of said red, green and blue wavelengths being spaced apart within respective said Trichel pulses a distance corresponding to an energy level of an electrical gradient in said gap that stimulates emission of said photons of red, green and blue wavelengths,
centering a first said generally spherical or cylindrical micromirror array configured in resonant relation with red wavelengths about a location in said Trichel pulses where said red wavelengths are emitted,
centering a second said generally spherical or cylindrical micromirror array configured in resonant relation with green wavelengths about a location in said Trichel pulses where said green wavelengths are emitted,
centering a third said generally spherical or cylindrical micromirror array configured in resonant relation with blue wavelengths about a location in said Trichel pulses where said blue wavelengths are emitted,
adjusting said first micromirror arrays, said second micromirror arrays and said third micromirror arrays to direct varying amounts of said red, green and blue wavelengths.

12. The method of claim 11 wherein said adjusting said first micromirror arrays, said second micromirror arrays and said third micromirror arrays to direct varying amounts of said red, green and blue wavelengths further comprises directing said varying amounts of said red, green and blue wavelengths back to respective locations in said Trichel pulses where said red, green and blue wavelengths are emitted, thereby separately attenuating or amplifying said red, green and blue wavelengths.

13. The method of claim 12 further comprising controlling said first micromirror arrays, said second micromirror arrays and said third micromirror arrays with an electrical signal.

14. The method of claim 13 wherein said controlling said first micromirror arrays, said second micromirror arrays and said third micromirror arrays with an electrical signal further comprises modulating said first micromirror arrays, said second micromirror arrays and said third micromirror arrays with electrical signals that represent at least intensities of a portion of an image.

15. The method of claim 2 further comprising mounting said generally cylindrical or spherical reflectors in gimbals, for allowing movement of said generally cylindrical or spherical reflectors in order to controllably direct an emitted beam from said generally cylindrical or spherical reflectors.

16. The method of claim 15 further comprising:
configuring a plurality of said generally cylindrical of spherical reflectors mounted in gimbals in an array,
controllably triggering said Trichel pulses of each of said opposed electrodes of each said cylindrical or spherical reflector in accordance with an image,
controllably moving said gimbals of each of said plurality of generally cylindrical or spherical reflectors in accordance with said image,
directing emitted beams from said plurality of generally cylindrical or spherical reflectors into eyes of a viewer so that a viewer is able to see a projected said image.

* * * * *